(12) United States Patent
Bae et al.

(10) Patent No.: US 12,395,265 B2
(45) Date of Patent: Aug. 19, 2025

(54) METHOD AND APPARATUS FOR TRANSMITTING AND RECEIVING OF ADAPTIVE POLAR CODING CONFIGURATION

(71) Applicant: Samsung Electronics Co., Ltd., Suwon-si (KR)

(72) Inventors: Junghyun Bae, Suwon-si (KR); Youngjoon Kim, Suwon-si (KR); Jungju Kim, Suwon-si (KR); Hyeoncheol Oh, Suwon-si (KR); Jungmin Yoon, Suwon-si (KR); Ilju Na, Suwon-si (KR); Kitaek Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 18/166,799

(22) Filed: Feb. 9, 2023

(65) Prior Publication Data
US 2023/0370190 A1    Nov. 16, 2023

(30) Foreign Application Priority Data

May 10, 2022   (KR) .................. 10-2022-0056928
Sep. 20, 2022  (WO) ............... PCT/KR2022/013537

(51) Int. Cl.
*H04L 1/00*  (2006.01)
*H04W 24/10* (2009.01)

(52) U.S. Cl.
CPC .......... *H04L 1/0009* (2013.01); *H04L 1/0057* (2013.01); *H04L 1/0064* (2013.01); *H04W 24/10* (2013.01)

(58) Field of Classification Search
CPC ..... H04L 1/009; H04L 1/0014; H04L 1/0057; H04L 1/0061; H04L 1/0064;
(Continued)

(56) References Cited

U.S. PATENT DOCUMENTS 10,849,012 B2   11/2020  Hwang et al.
2016/0301777 A1 10/2016  Hori et al.
(Continued)

FOREIGN PATENT DOCUMENTS

AU   2021350947 A1 *  3/2023  ............ H04W 16/14
CN      113424469 A  *  9/2021  ........ H03M 13/1102
(Continued)

OTHER PUBLICATIONS

3rd Generation Partnership Project; Technical Specification Group Radio Access Network; NR; Multiplexing and channel coding (Release 17), 3GPP, TS 38.212, V17.1.0, Apr. 1, 2022.
(Continued)

*Primary Examiner* — Phong La
(74) *Attorney, Agent, or Firm* — Jefferson IP Law, LLP

(57) ABSTRACT

The disclosure relates to a 5th generation (5G) or 6th generation (6G) communication system for supporting a higher data transmission rate beyond a 4th generation (4G) communication system, such as long term evolution (LTE). A method and an apparatus for transmitting and receiving channel coding-related information between a base station and a user equipment (UE) in a communication system are provided.

16 Claims, 19 Drawing Sheets

(58) Field of Classification Search
CPC ... H04L 1/0056; H04L 1/0046; H04L 1/0047; H04L 1/0071; H04L 1/0059; H04W 24/10; H04W 24/00
See application file for complete search history.

(56) References Cited

U.S. PATENT DOCUMENTS

| | | |
|---|---|---|
| 2019/0068225 A1 | 2/2019 | Yu |
| 2019/0238260 A1 | 8/2019 | Kang et al. |
| 2019/0372605 A1 | 12/2019 | Li et al. |
| 2020/0021393 A1 | 1/2020 | Noh et al. |
| 2020/0099471 A1 | 3/2020 | Ye et al. |
| 2020/0252084 A1 | 8/2020 | Chen et al. |
| 2020/0321982 A1* | 10/2020 | Kamiya ............ H03M 13/6516 |
| 2020/0358552 A1 | 11/2020 | Leung |
| 2020/0374033 A1 | 11/2020 | Chen et al. |
| 2021/0083795 A1* | 3/2021 | Chen .................... H04B 7/0473 |
| 2021/0306005 A1* | 9/2021 | Sheiman ............... H03M 13/13 |
| 2022/0206746 A1* | 6/2022 | Kamiya .................... G06F 7/76 |
| 2022/0278772 A1* | 9/2022 | Jang ...................... H04L 1/0054 |
| 2023/0370190 A1* | 11/2023 | Bae ....................... H04W 72/04 |

FOREIGN PATENT DOCUMENTS

| | | | |
|---|---|---|---|
| CN | 113810155 A | * 12/2021 | .......... H03M 13/036 |
| EP | 2 667 532 A1 | 11/2013 | |
| JP | 2018-121357 A | 8/2018 | |
| KR | 10-2018-0041084 A | 4/2018 | |
| KR | 10-2019-0013660 A | 2/2019 | |
| KR | 10-2021-0064401 A | 6/2021 | |
| WO | 2018/130221 A1 | 7/2018 | |
| WO | 2019/137415 A1 | 7/2019 | |
| WO | WO-2019130475 A1 | * 7/2019 | ............ H03M 13/09 |
| WO | WO-2022149589 A1 | * 7/2022 | |
| WO | WO-2023204328 A1 | * 10/2023 | |

OTHER PUBLICATIONS

Extended European Search Report dated Jun. 13, 2025, issued in European Patent Application No. 22941797.7.

* cited by examiner

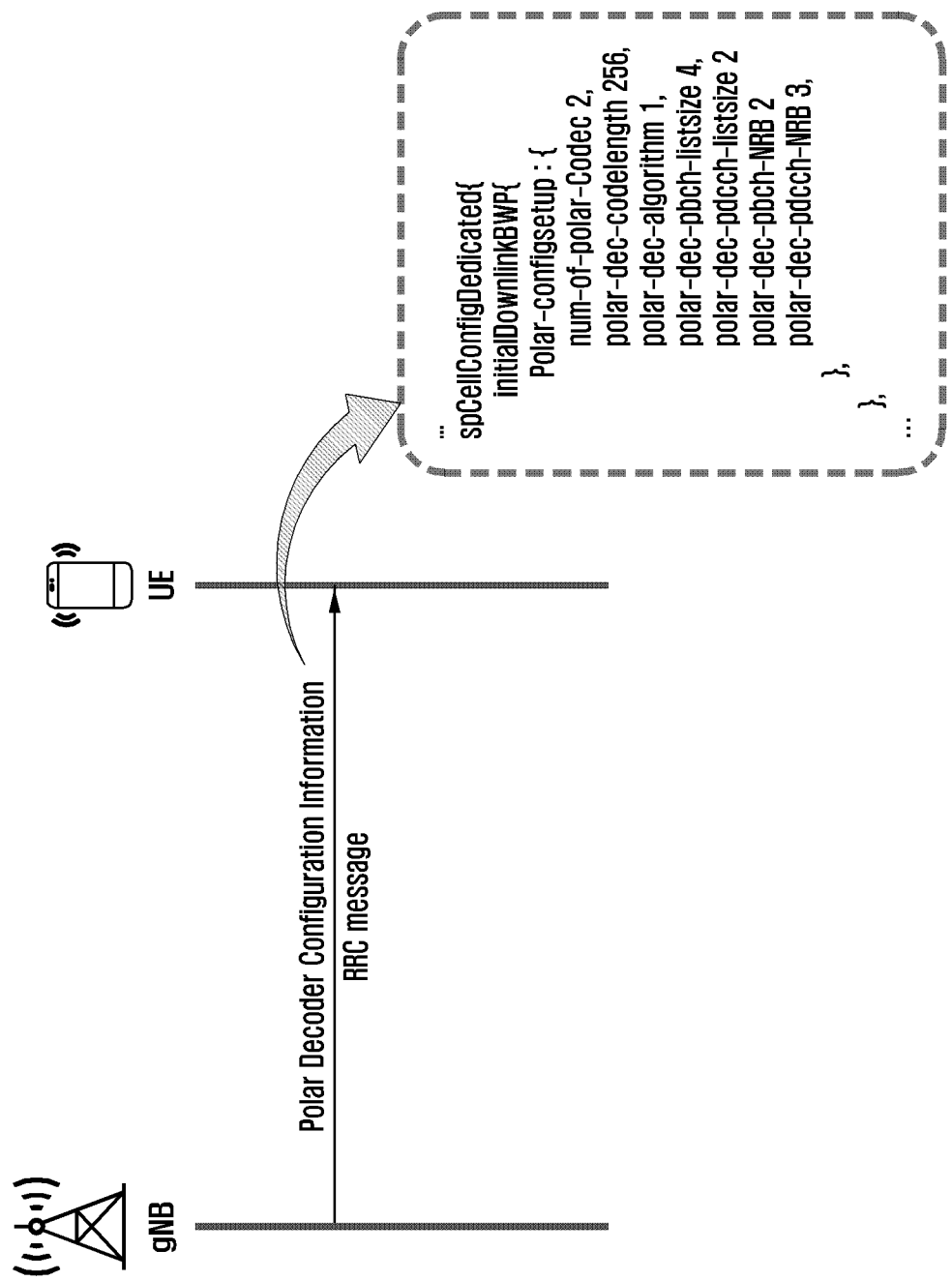

METHOD AND APPARATUS FOR TRANSMITTING AND RECEIVING OF ADAPTIVE POLAR CODING CONFIGURATION

CROSS-REFERENCE TO RELATED APPLICATION(S)

This application is based on and claims priority under 35 U.S.C. § 119(a) of an International application number PCT/KR2022/013537, filed on Sep. 8, 2022, and a Korean patent application number 10-2022-0056928, filed on May 10, 2022, in the Korean Intellectual Property Office, the disclosure of which is incorporated by reference herein in its entirety.

BACKGROUND

1. Field

The disclosure relates to a method and an apparatus for transmitting and receiving channel coding-related information between a base station and a user equipment (UE) in a communication system.

2. Description of Related Art

A review of the development of wireless communication from generation to generation shows that the development has mostly been directed to technologies for services targeting humans, such as voice-based services, multimedia services, and data services. It is expected that connected devices which are exponentially increasing after commercialization of 5th generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve in various form factors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be implemented approximately by 2030, will have a maximum transmission rate of tera (1,000 giga)-level bits per second (bps) and a radio latency of 100 μsec, and thus will be 50 times as fast as 5G communication systems and have ¹/₁₀ the radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in millimeter wave (mmWave) bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems a full-duplex technology for allowing an uplink (UE transmission) and a downlink (node B transmission) to simultaneously use the same frequency resource at the same time, a network technology for utilizing satellites, high-altitude platform stations (HAPS), and the like in an integrated manner, a network structure innovation technology for supporting mobile nodes B and the like and allowing network operation optimization and automation and the like, a dynamic spectrum sharing technology though collision avoidance based on spectrum use prediction, an artificial intelligence (AI)-based communication technology for implementing system optimization by using AI from the technology design step and internalizing end-to-end AI support functions, and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will allow the next hyper-connected experience in new dimensions through the hyper-connectivity of 6G communication systems that covers both connections between things and connections between humans and things. Particularly, it is expected that services such as truly immersive extended reality (XR), high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

In a communication system, a specific channel coding scheme is applied to a signal to identify whether an error occurs in transmission or reception. For example, in a 5G system, a coding scheme of a polar code is adopted for transmission of a control channel. Channel coding entails high power consumption due to high computational complexity. In particular, polar coding has a long processing time due to a sequential decoding algorithm, thus involving higher power consumption than other channel coding schemes.

The 5G system is designed to use the same polar code configuration when the same radio resources are allocated for required transmission data. However, as described above, since polar coding having a long processing time due to use of sequential decoding entails high power consumption due to a high computation complexity, it may be inefficient to apply the same configuration.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for adaptively providing configuration information about a polar code.

Another aspect of the disclosure is to provide an overall signaling procedure for adaptively applying or changing a polar coding configuration in consideration of a capability of a user equipment (UE), a base station, and a channel state.

Additional aspects will be set forth in part in the description which follows and, in part, will be apparent from the description, or may be learned by practice of the presented embodiments.

In accordance with an aspect of the disclosure, a method performed by a base station in a wireless communication system is provided. The method includes determining a polar coding configuration for a terminal and transmitting, to the terminal, configuration information on the determined polar coding configuration, wherein the configuration information includes information on at least one of a number of a polar decoder, a length of a polar code, a polar decoding algorithm, a list size of the polar decoding algorithm, a number of a reconfiguration bit to reconfigure an index for a polar decoding, or a polar sequence.

In accordance with another aspect of the disclosure, a method of a terminal in a wireless communication system is provided. The method includes receiving, from a base station, configuration information on a polar coding configuration and decoding a signal based on the configuration information, wherein the configuration information includes information on at least one of a number of a polar decoder, a length of a polar code, a polar decoding algorithm, a list size of the polar decoding algorithm, a number of a reconfiguration bit to reconfigure an index for a polar decoding, or a polar sequence.

In accordance with another aspect of the disclosure, a base station in a wireless communication system is provided. The base station includes a transceiver and a controller configured to determine a polar coding configuration for a terminal, and control the transceiver to transmit, to the terminal, configuration information on the determined polar coding configuration, wherein the configuration information includes information on at least one of a number of a polar decoder, a length of a polar code, a polar decoding algorithm, a list size of the polar decoding algorithm, a number of a reconfiguration bit to reconfigure an index for a polar decoding, or a polar sequence.

In accordance with another aspect of the disclosure, a terminal in a wireless communication system is provided. The terminal includes a transceiver and a controller configured to control the transceiver to receive, from a base station, configuration information on a polar coding configuration, and decode a signal based on the configuration information, wherein the configuration information includes information on at least one of a number of a polar decoder, a length of a polar code, a polar decoding algorithm, a list size of the polar decoding algorithm, a number of a reconfiguration bit to reconfigure an index for a polar decoding, or a polar sequence.

According to the disclosure, a polar coding-related configuration may be adaptively determined and provided according to a situation, thereby reducing a processing time and power consumption and improving communication performance and efficiency in using radio resources.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates an example in which configuration information is transmitted through radio resource control (RRC) signaling according to an embodiment of the disclosure;

Throughout the drawings, it should be noted that like reference numbers are used to depict the same or similar elements, features, and structures.

DETAILED DESCRIPTION

Figure 1:
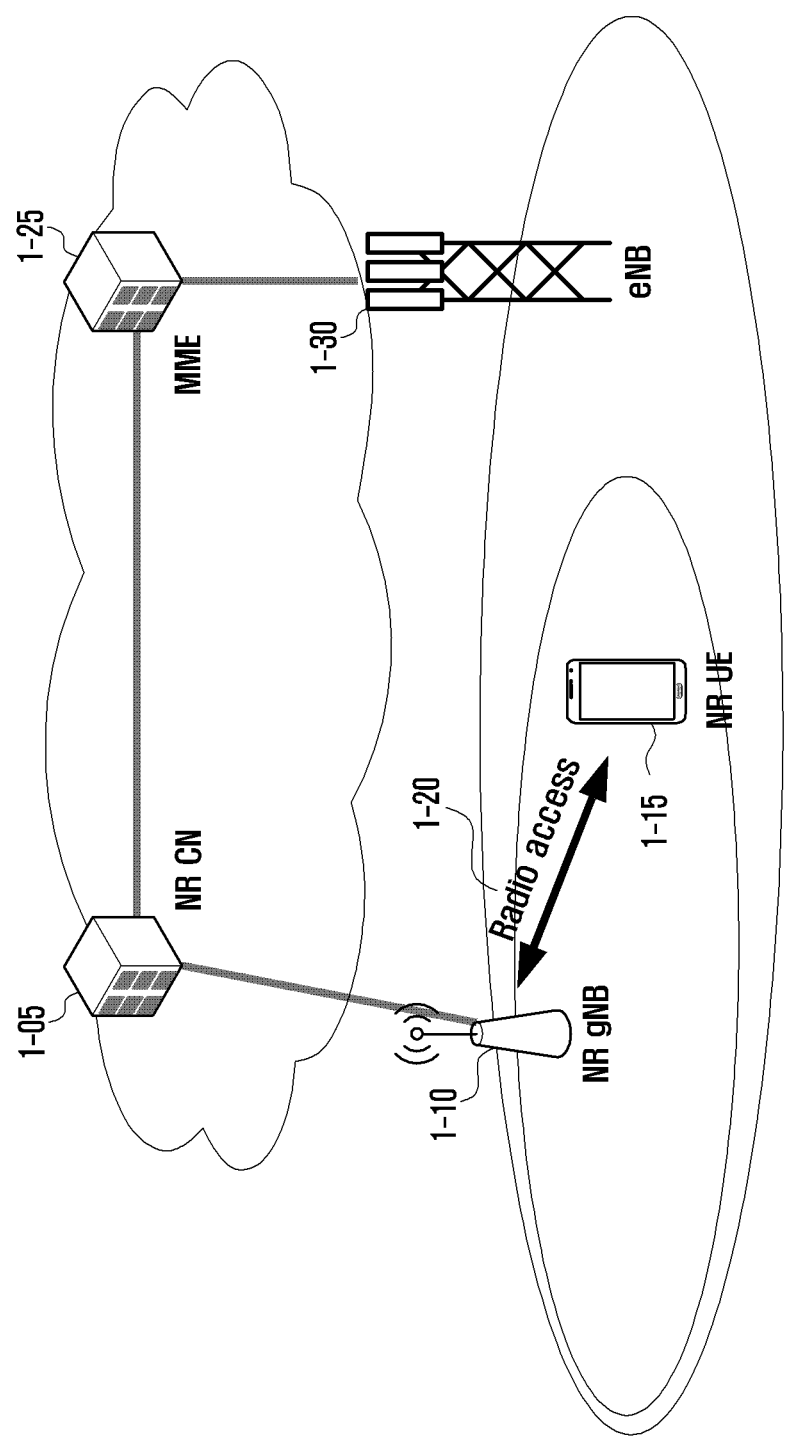
FIG. 1 illustrates the structure of a next-generation mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, in the embodiments, the "unit" may include one or more processors.

In the following description, terms for identifying access nodes, terms referring to network entities, terms referring to messages, terms referring to interfaces between network entities, terms referring to various identification information, and the like are illustratively used for the convenience of description. Therefore, the disclosure is not limited by the terms as used below, and other terms referring to subjects having equivalent technical meanings may be used.

In the following description, the disclosure will be described using terms and names defined in the 3rd generation partnership project (3GPP) long term evolution (LTE) standards for the convenience of description. However, the disclosure is not limited by these terms and names, and may be applied in the same way to systems that conform other standards. In the disclosure, the term "evolved Node B (eNB)" may be interchangeably used with the term "next-generation node B (gNB)." That is, a base station described as "eNB" may indicate "gNB." Also, the term "terminal" may refer to mobile phones, NB-Internet of things (IoT) devices, sensors, and other wireless communication devices.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto.

In particular, the disclosure may be applied to 3GPP new radio (NR) (the 5$^{th}$ generation (5G) mobile communication standard). In addition, the disclosure may be applied to intelligent services (e.g., smart homes, smart buildings, smart cities, smart cars or connected cars, healthcare, digital education, retail business, security and safety-related services, etc.) on the basis of 5G communication technology and internet of things (IoT)-related technology.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), Institute of Electrical and Electronics Engineers (IEEE) 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to some embodiments, eMBB may aim at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced MIMO transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 16 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and may also require a design to assign a large number of resources in a frequency band in order to secure reliability of a communication link.

The above three services considered in the 5G communication system, that is, eMBB, URLLC, and mMTC, may be multiplexed and transmitted in a single system. In this case, different transmission/reception techniques and transmission/reception parameters may be used between services in order to satisfy different requirements of the respective services. However, the above-described mMTC, URLLC, and eMBB are merely an example of different types of services, and service types to which the disclosure is applied are not limited to the above example.

In the following description of embodiments of the disclosure, the LTE, LTE-A, Pro, or 5G (or NR, next-generation mobile communication) system will be described by way of example, but the embodiments of the disclosure may be applied to other communication systems having similar backgrounds or channel types. Furthermore, based on determinations by those skilled in the art, the embodiments of the disclosure may be applied to other communication systems having similar backgrounds or channel types through some modifications without significantly departing from the scope of the disclosure.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

FIG. 1 illustrates the structure of a next-generation mobile communication system according to an embodiment of the disclosure.

Referring to FIG. 1, a radio access network of the next-generation mobile communication system (hereinafter, referred to as NR or 5G) may include a new radio node B (hereinafter, an NR, gNB, or NR base station) 1-10 and a new radio core network (NR CN) 1-05. A new radio user equipment (hereinafter, an NR UE or UE) 1-15 may access an external network through the NR gNB 1-10 and the NR CN 1-05.

In FIG. 1, the NR gNB 1-10 may correspond to an evolved node B (eNB) of an existing LTE system. The NR gNB is connected to the NR UE 1-15 over a wireless channel (e.g., radio access 1-20), and may provide a more advanced service than that of the existing node B. In the next-generation mobile communication system, all user traffic may be served through a shared channel Therefore, a device that collects state information, such as a buffer status of UEs, an available transmission power state, and a channel state, and performs scheduling is required, and the NR gNB 1-10 may serve as this device. One NR gNB may control a plurality of cells.

The next-generation mobile communication system may apply a bandwidth of an existing maximum bandwidth or greater in order to realize ultrahigh-speed data transmission compared to current LTE. Further, the next-generation mobile communication system may employ a beamforming technique in addition to OFDM as a radio access technology. In addition, the next-generation mobile communication system may apply adaptive modulation and coding (AMC), which determines a modulation scheme and a channel coding rate according to the channel state of a UE.

The NR CN 1-05 may perform functions of mobility support, bearer setup, and quality of service (QoS) setup. The NR CN is a device that performs not only a mobility management function for a UE but also various control functions, and may be connected to a plurality of base stations. The next-generation mobile communication system may also interwork with the existing LTE system, in which case the NR CN may be connected to a mobile management entity (MME) 1-25 through a network interface. The MME is connected to the eNB 1-30, which is an existing base station.

Figure 2:
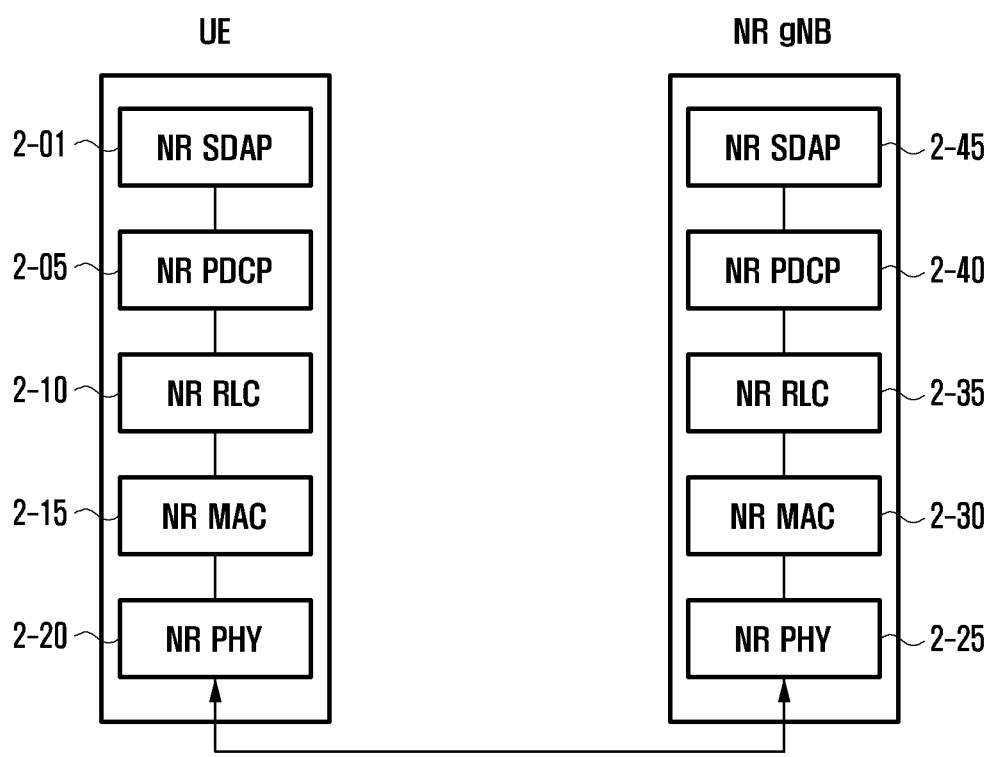
FIG. 2 illustrates the wireless protocol structure of a next-generation mobile communication system according to an embodiment of the disclosure.

FIG. 2 illustrates the wireless protocol structure of a next-generation mobile communication system according to an embodiment of the disclosure.

Referring to FIG. 2, a wireless protocol of the next-generation mobile communication system includes NR service data adaptation protocols (SDAPs) 2-01 and 2-45, NR packet data convergence protocols (PDCPs) 2-05 and 2-40, NR radio link controls (RLCs) 2-10 and 2-35, and NR MACs 2-15 and 2-30, and NR physicals (PHYs) 2-20 and 2-25 respectively at a UE and an NR base station.

Main functions of the NR SDAPs 2-01 and 2-45 may include some of the following functions.
Transfer of user plane data;
Mapping between QoS flow and data radio bearer (DRB) for both downlink (DL) and uplink (UL);
Marking QoS flow identifier (ID) in both DL and UL packets;
Reflective QoS flow-to-DRB mapping for UL SDAP protocol data units (PDUs);

Regarding an SDAP-layer device, the UE may receive a configuration about whether to use a header of the SDAP-layer device or whether to use a function of the SDAP-layer device for each PDCP-layer device, each bearer, or each logical channel via a radio resource control (RRC) message received from the base station. When an SDAP header is configured, a one-bit non-access stratum (NAS) quality of service (QoS) reflective indicator (NAS reflective QoS) and a one-bit access stratum (AS) QoS reflective indicator (AS reflective QoS) of the SDAP header may be used for indication to allow the UE to update or reconfigure uplink and downlink QoS flows and mapping information for a data bearer. The SDAP header may include QoS flow ID information indicating QoS. The QoS information may be used as a data processing priority, scheduling information, and the like in order to support a desired service.

Main functions of the NR PDCPs 2-05 and 2-40 may include some of the following functions.
Header compression and decompression (robust header compression (ROHC) only);
Transfer of user data;
In-sequence delivery of upper-layer PDUs;
Out-of-sequence delivery of upper-layer PDUs;
PDCP PDU reordering for reception;
Duplicate detection of lower-layer service data units (SDUs);
Retransmission of PDCP SDUs;
Ciphering and deciphering; and
Timer-based SDU discard in uplink.

Among the above functions, the reordering function of an NR PDCP device refers to a function of rearranging PDCP PDUs received in a lower layer in order on the basis of the PDCP sequence number (SN). The reordering function of the NR PDCP device may include a function of transmitting the data to an upper layer in the order of rearrangement or a function of immediately transmitting the data regardless of order. In addition, the reordering function may include a function of recording lost PDCP PDUs via reordering, may include a function of reporting the state of lost PDCP PDUs to a transmitter, and may include a function of requesting retransmission of lost PDCP PDUs.

Main functions of the NR RLCs 2-10 and 2-35 may include some of the following functions.
Transfer of upper-layer PDUs;
In-sequence delivery of upper-layer PDUs;
Out-of-sequence delivery of upper-layer PDUs;
Error Correction through automatic repeat request (ARQ);
Concatenation, segmentation, and reassembly of RLC SDUs;
Re-segmentation of RLC data PDUs;
Reordering of RLC data PDUs;
Duplicate detection;
Protocol error detection;
RLC SDU discard; and
RLC re-establishment.

Among the above functions, the in-sequence delivery function of the NR RLC device refers to a function of delivering RLC SDUs received from a lower layer to an upper layer in order. The in-sequence delivery function of the NR RLC device may include a function of reassembling and delivering a plurality of RLC SDUs when one original RLC SDU is divided into the plurality of RLC SDUs to be received.

The in-sequence delivery function of the NR RLC device may include a function of rearranging received RLC PDUs on the basis of the RLC SN or the PDCP SN, may include a function of recording lost RLC PDUs via reordering, may include a function of reporting the state of lost RLC PDUs to a transmitter, may include a function of requesting retransmission of lost RLC PDUs.

When there is a lost RLC SDU, the in-sequence delivery function of the NR RLC device may include may include a function of delivering only RLC SDUs before the lost RLC SDU to an upper layer in order.

The in-sequence delivery function of the NR RLC device may include a function of delivering all RLC SDUs, received before a timer starts, to an upper layer in order when the timer has expired despite presence of a lost RLC SDU.

The in-sequence delivery function of the NR RLC device may include a function of delivering all RLC SDUs received so far to an upper layer in order when the timer expires despite presence of a lost RLC SDU.

The NR RLC device may process RLC PDUs in order of reception regardless of the order of SNs, and may deliver the RLC PDUs to the NR PDCP device in an out-of-sequence manner.

When receiving a segment, the NR RLC device may receive segments that are stored in a buffer or are to be received later, may reconstruct the segments into one whole RLC PDU, and may deliver the RLC PDU to the NR PDCP device.

The NR RLC layers may not include a concatenation function, and the concatenation function may be performed in the NR MAC layers or may be replaced with a multiplexing function of the NR MAC layers.

The out-of-sequence delivery function of the NR RLC device refers to a function of delivering RLC SDUs received from a lower layer directly to an upper layer regardless of order. The out-of-sequence delivery function of the NR RLC devices may include a function of reassembling and delivering a plurality of RLC SDUs when one original RLC SDU is divided into the plurality of RLC SDUs to be received. In addition, the out-of-sequence delivery function of the NR RLC device may include a function of recording lost RLC PDUs by storing and reordering the RLC sequence numbers (SNs) or PDCP SNs of received RLC PDUs.

The NR MACs 2-15 and 2-30 may be connected to a plurality of NR RLC-layer device configured in one device, and main functions of the NR MACs may include some of the following functions.

Mapping between logical channels and transport channels;
Multiplexing/demultiplexing of MAC SDUs;
Scheduling information reporting;
Error correction through hybrid ARQ (HARQ);
Priority handling between logical channels of one UE;
Priority handling between UEs via dynamic scheduling;
Multimedia broadcast multicast service (MBMS) service identification;
Transport format selection; and
Padding.

The NR PHY layers 2-20 and 2-25 may perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

In a current 5G system, a coding scheme for transmission is fixed according to the type of information or channel to be transmitted. For example, referring to Table 1 below, polar coding is applied to most broadcast channels and control channels, and a low-density parity-check code (LDPC) is applied to data channels.

TABLE 1

| | Channel | Coding Algorithm | Reference |
|---|---|---|---|
| | BCH | Polar Coding | 38.212-7.1.4 |
| | DCI | Polar Coding | 38.212-7.3.3 |
| UCI | 12 or more bits | Polar Coding | 38.212-6.3.1.3, 6.3.2.3 |
| | 1 bit | Repetition Code | |
| | 2 bit | Simplex Code | |
| | 3 to 11 bits | Reed-Muller Code | |
| | DL-SCH | LDPC | 38.212-7.2.4 |
| | UL-SCH | LDPC | 38.212-6.2.4 |

The LDPC employs a parallel operation in decoding and thus has a relatively short processing time, while the polar coding employs a sequential operation in decoding and thus has a long processing time.

In the current 5G system, error correction performance required for communication is configured to a very high level, and polar coding configuration parameters are fixedly applied based on the error correction performance configured to the high level. The error correction performance may be expressed, for example, by the difference (dB) between the error correction capability of an error correction code (e.g., bit error rate (BER)/frame error rate (FER)) used in each signal-to-noise ratio (SNR) and a minimum error correction capability required by the system. That is, even though an optimal configuration may be different depending on a factor, such as the performance of a UE or the state of a channel between a base station and a UE, a configuration to satisfy the high error correction performance required by the system is currently applied equally to all channel coding. When applying only a fixed configuration that satisfies the high level of error correction performance, power consumption increases due to a long processing time, computational complexity increases, and resource use efficiency decreases.

Hereinafter, adaptively adjusting and configuring a polar coding-related configuration proposed in the disclosure will be described. Specifically, a specific operation in which a transmission device determines a polar coding configuration to be applied to a reception device and a specific operation regarding which signaling the transmission device uses to transmit information on the generated polar coding configuration to the reception device through will be described in detail with reference to the accompanying drawings.

The transmission device and the reception device to which embodiments described in the disclosure are applied may include various entities operating in a wireless communication system. For example, the transmission device may be a base station and the reception device may be a UE, or both the transmission device and the reception device may be UEs. For example, when the transmission device is a base station and the reception device is a UE, the base station may adaptively configure polar coding configuration information to be used by the UE in consideration of the capability of the UE related to a polar decoding operation of the UE, a current channel state, and the like. In addition, for example, when both the transmission device and the reception device are UEs as in edge computing or machine-to-machine communication, a UE of the transmission device may adaptively provide polar decoding configuration information applied to a UE of the reception device. In this case, depending on a mode in which communication between the UEs operates, the UE of the transmission device may provide the polar coding configuration information obtained from a base station to the UE of the reception device as it is, or may selectively change and provide the polar coding configuration information in view of the state of a channel with the UE of the reception device.

Although operations of determining and signaling the polar coding-related configuration proposed in the disclosure may be performed by various entities as described above, the transmission device is specified as a base station and the reception device is specified as a UE in the following description for convenience of description.

Further, in this specification, configuration information on a polar coding configuration may be referred to as a polar coding configuration, polar coding-related configuration information, polar coding configuration information, configuration information, or polar decoder configuration information.

Figure 3A:
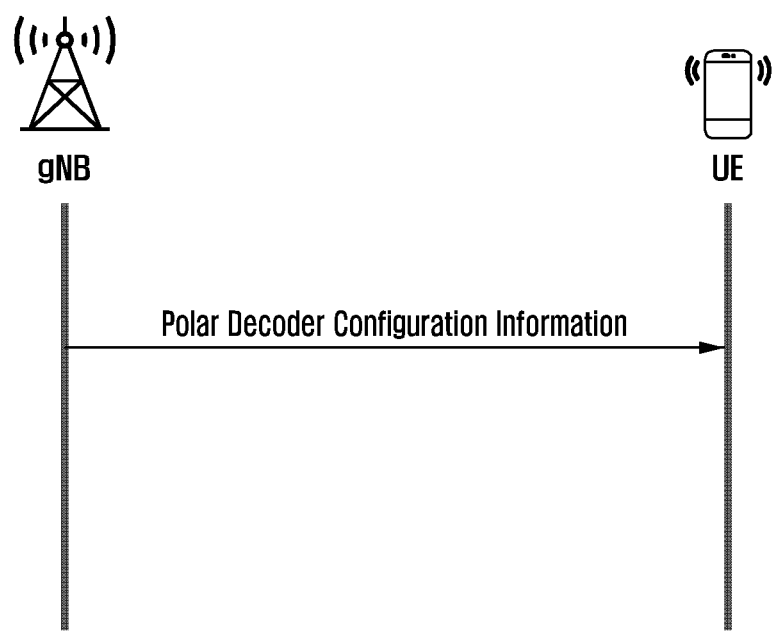
FIG. 3A illustrates transmission of polar coding configuration information according to an embodiment of the disclosure.
Figure 3B:
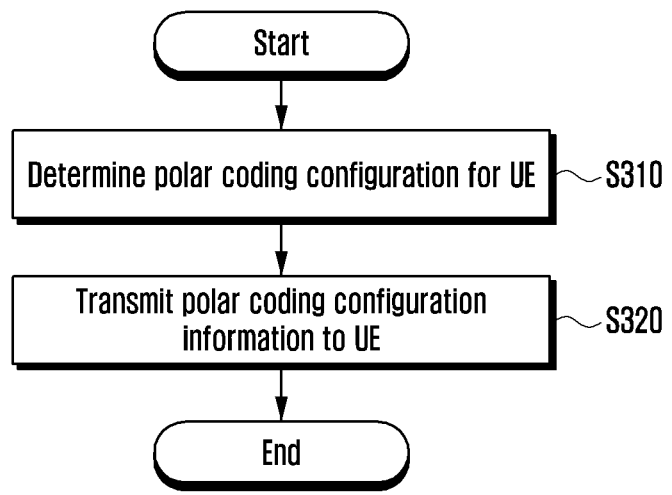
FIG. 3B is a flowchart illustrating an operation of a base station according to an embodiment of the disclosure.

FIG. 3A illustrates transmission of polar coding configuration information according to an embodiment of the disclosure, and FIG. 3B is a flowchart illustrating an operation of a base station according to an embodiment of the disclosure.

Referring to FIGS. 3A and 3B, the base station according to an embodiment of the disclosure may determine a polar coding configuration for a UE in operation S310.

The base station according to an embodiment of the disclosure may consider various conditions when determining the polar coding configuration for the UE. For example, the base station may determine polar coding configuration parameters for the UE, based on various conditions, such as capability information of the UE related to polar coding, the state of a channel between the UE and the base station, a power consumption state of the UE, and a request of the UE. For example, when a channel quality (e.g., reference signal received power (RSRP), an SNR, or a signal-to-interference plus noise ratio (SINR)) satisfies a specific threshold value, the base station of the disclosure may determine a polar coding configuration for reducing the processing time or power consumption of the UE. However, when the channel quality is below the specific threshold value, the base station may determine a polar coding configuration for increasing a decoding capability so that error correction performance is not deteriorated. The base station may adaptively determine the polar coding configuration for the UE according to various conditions. Operations of the base station and the UE related to other various conditions or specific signaling will be described later in detail with reference to FIGS. 7 to 15.

The polar coding configuration determined by the base station for the UE may include a configuration for various parameters that may affect the processing time, power consumption, or error correction capability of the UE. For example, the polar coding configuration may include at least one configuration for parameters including the number of decoders of polar coding, the length of a polar code, a decoding algorithm used for polar coding (e.g., a successive cancellation (SC) decoding algorithm and a successive cancellation list (SCL) decoding algorithm), a list size applied to the decoding algorithm, the number of payload bits to reconfigure an index when performing polar decoding, a start index of the payload bits, an index of all payload bits, or a polar reliability sequence.

Specifically, when the condition that the channel quality is the specific threshold value or greater is satisfied, the base station may determine the polar coding configuration for the UE such that a plurality of polar decoders is used in order to reduce the processing time of the UE. In this case, the base station may determine the number of decoders to be applied to the UE within a range of not exceeding the maximum number of decoders supportable by the UE.

Further, for example, the base station may determine a short polar code length to reduce the power consumption of the UE. A long code length improves the decoding capability but increases the processing time. Thus, the base station may determine to configure a short code length, thereby reducing the power consumption of the UE. However, considering a deterioration in the error correction performance, the base station may determine to apply a short code length when the condition that the channel quality is the specific threshold or greater is satisfied.

In addition, for example, the base station may determine to apply an appropriate decoding algorithm in consideration of performance of each decoding algorithm. For example, since the SCL algorithm has a higher decoding capability but has a longer processing time than the SC algorithm, the base station may determine a polar coding configuration such that the SCL algorithm is used but the SC algorithm is used when the condition that the channel quality is the specific threshold or greater is satisfied.

Further, for example, when the SCL decoding algorithm is applied, the base station may reduce a list size of an SCL polar decoder. As the size of a list increases, decoding complexity increases due to an increase in decoded codeword candidates, thus increasing the processing time. Thus, when the channel quality is the specific threshold or greater, the base station may reduce the list size, thereby reducing the processing time of the UE.

In addition, for example, the base station may configure an initial bit of a payload to be changed to a bit index having a next highest channel capacity. In a polar decoder which starts decoding from a first bit index, since a bit before the payload is determined to be 0 regardless of a decoding process and thus does not need an operation, some initial bits may be reconfigured, thereby reducing the processing time of the UE. Hereinafter, the reconfigured initial bits are referred to as a number of reconfiguration bits (NRBs). For example, the base station may configure an NRB value for the UE when the communication channel quality is the specific threshold value or greater, and may change the NRB value to an original value to improve the error correction capability of the UE when the channel quality of the UE decreases to less than the specific threshold value.

Further, for example, the base station may configure an optimal reliability sequence to be variably used according to a situation and purpose of the UE or the base station. Here, the default values of the foregoing parameters (the number of decoders, the algorithm, and the like) may vary depending on the type of the reliability sequence.

When the polar coding configuration is determined, the base station according to an embodiment of the disclosure may transmit determined polar decoder configuration information to the UE in operation S320.

Here, the configuration information may be transmitted to the UE through an information field indicating each configuration for at least one of the various parameters described above. For example, the base station may determine at least one parameter to be variably configured for the UE, and may transmit information indicating each configured value for the parameter to the UE.

However, the base station may transmit the configuration information in a manner of indicating any one of a plurality of modes defined by a combination of at least some of the foregoing various parameters to the UE. Here, each mode may be a mode in which at least some parameters are configured in advance to specific values according to a predetermined purpose (e.g., reduction of the processing time and guarantee of reliability).

For example, a plurality of modes may be defined as illustrated below in Table 2.

TABLE 2

|  | Number of polar decoders | Code length | Decoding algorithm | List size | NRB |
| --- | --- | --- | --- | --- | --- |
| Mode 1 | 1 | 512 | SCL | 8 | 0 |
| Mode 2 | 4 | 128 | SC | 0 | 3 |
| Mode 3 | 2 | 256 | SCL | 2 | 1 |

Mode 1 is a mode for a basic operation, such as in new radio (NR), and is a mode that operates to satisfy error correction performance much higher than a specific error correction performance required by a system. This mode may be applied when a channel state of the UE is not known (e.g., in an initial access operation) or when repeated decoding errors occur. Mode 2 may be a mode applied when the state of a channel between the UE and the base station is very good. This mode is a mode allowing the processing time to be minimized, and operates with a maximum number of available polar decoders and with an SC algorithm having the lowest computational complexity, in which NRB may be configured to a value as large as possible.

Mode 3 may be applied when the base station knows the channel state of the UE but the channel state is not good or when reliability needs to be guaranteed even though the channel state is good. Therefore, the base station of the disclosure may appropriately select mode 1 when reliability and error correction performance need to be optimized, mode 2 when reliability may be slightly deteriorated but the processing time or power consumption of the UE needs to be reduced, or mode 3 when the channel state is good but reliability needs to be guaranteed, and may then transmit information indicating the selected mode to the UE.

The foregoing configuration information on the polar coding configuration may be transmitted to the UE through various types of signaling. Hereinafter, a specific signaling method will be described with reference to FIGS. 4 to 6.

Figure 5:
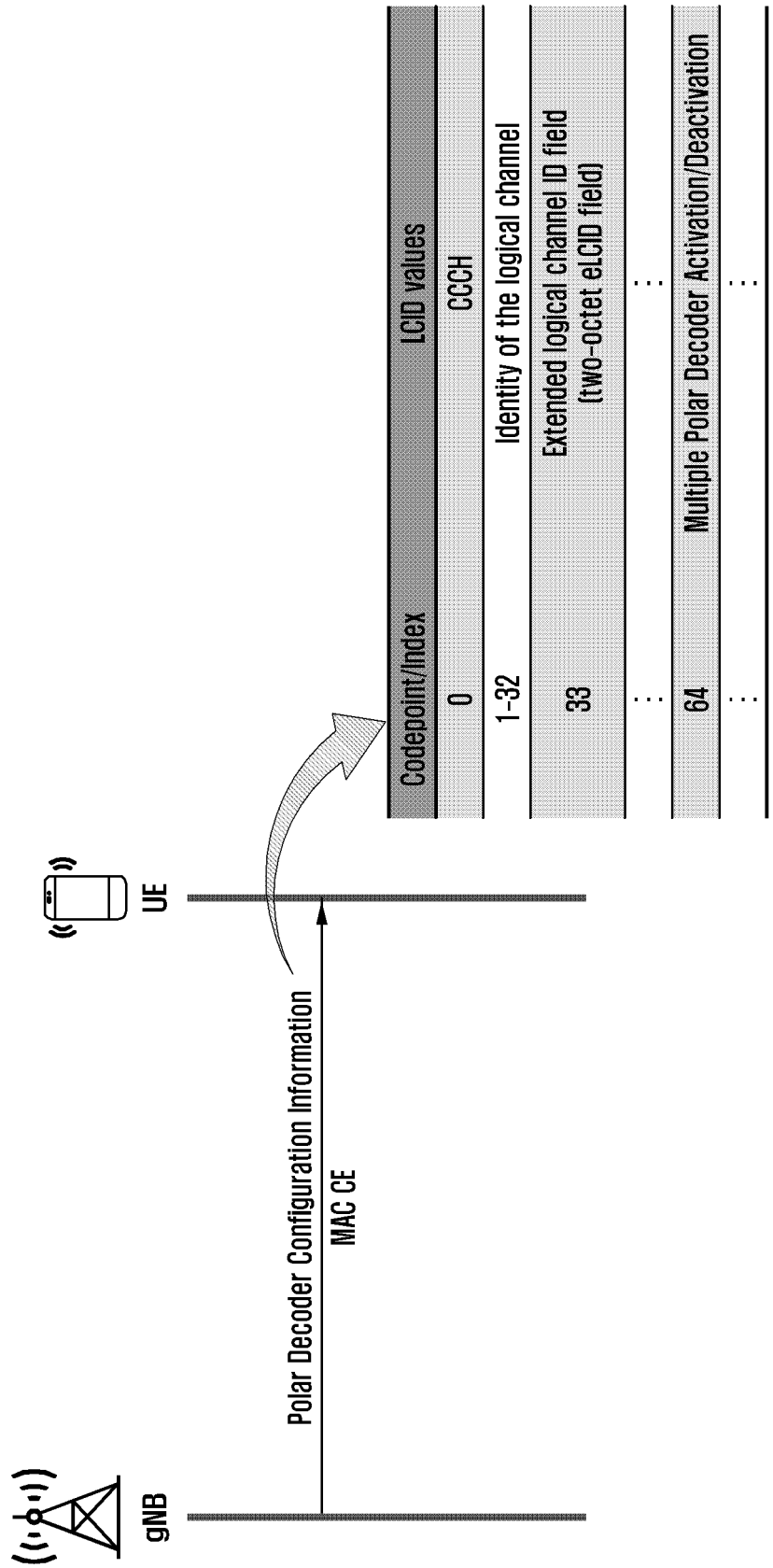
FIG. 5 illustrates an example in which configuration information is transmitted through a medium access control (MAC) control element (CE) according to an embodiment of the disclosure.
Figure 6:
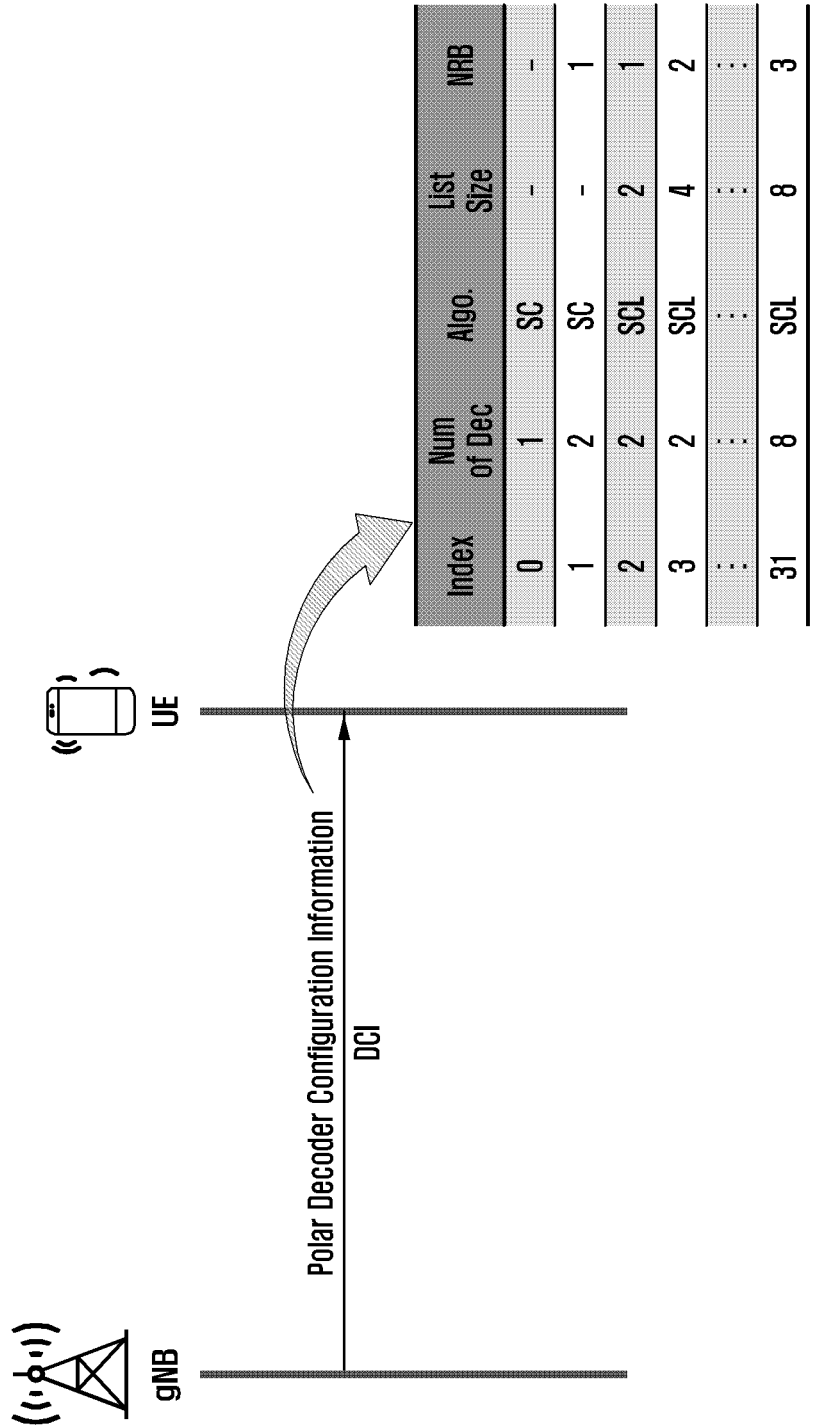
FIG. 6 illustrates an example in which configuration information is transmitted through downlink control information (DCI) according to an embodiment of the disclosure.

FIG. 4 illustrates an example in which configuration information is transmitted through RRC signaling according to an embodiment of the disclosure, FIG. 5 illustrates an example in which configuration information is transmitted through an MAC CE according to an embodiment of the disclosure, and FIG. 6 illustrates an example in which configuration information is transmitted through DCI according to an embodiment of the disclosure.

Configuration information on a polar coding configuration according to an embodiment of the disclosure may be transmitted through a radio resource control (RRC) message as illustrated in FIG. 4. For example, as the RRC message, an RRCReconfiguration message or an RRCRestablishment message may be used. Although FIG. 4 shows that the configuration information on the polar coding configuration is included in a configuration of an initial downlink (DL) bandwidth part (BWP) included in serving cell configuration information of the RRC message, the configuration information on the polar coding configuration may be included, for example, in other information configured to be dedicated to the UE without being limited thereto.

Referring to FIG. 4, the RRC message may include an information field indicating a configuration for each of the foregoing various parameters.

Here, information indicating a configuration for each parameter may be optionally included, and at least some of the various parameters may be configured differently for each physical channel. For example, the number of NRBs applied to a physical broadcast channel (PBCH) and the number of NRBs applied to a physical downlink control channel (PDCCH) may be differently configured. In addition, even though the same decoding algorithm is applied, a list size of the algorithm may be configured differently for each physical channel.

Although not shown in FIG. 4, information indicating one of the three operation modes for the polar coding configuration described above may be included as the configuration information on the polar coding configuration in the RRC message.

Referring to FIG. 5, configuration information on a polar coding configuration may be transmitted through a medium access control (MAC) control element (CE).

For example, the configuration information on the polar coding configuration may be included in a logical channel identity (LCID) value of the MAC CE. In a specific example, configuration information on a specific polar coding configuration may be mapped and defined by code point index, and the UE may identify configuration information corresponding to an LCID value of a MAC CE, based on the LCID value of the MAC CE. In this case, polar coding configuration information mapped to a code point index may correspond to a mode defined by configured values of some of the foregoing parameters. In another example, an RRC message may provide some parameters variably applicable to the UE among a plurality of parameters and configured values for the parameters, in which case a value to be applied to the UE among the configured value may be indicated by a MAC CE. Further, for example, as illustrated in FIG. 5, whether to activate a change of a configured value of a specific parameter among various parameters may be indicated by a MAC CE.

Referring to FIG. 6, configuration information on a polar coding configuration may be transmitted through downlink control information (DCI). For example, as illustrated in FIG. 6, configured values for some parameters may be predefined by index, and a specific index may be indicated by using a bit value of the DCI, thereby providing the configuration information on the polar coding configuration to the UE. In another example, when configured values for a plurality of parameters are provided through an RRC message, configured values of some parameters to be variably applied to the UE among the configured values may be indicated through DCI. In still another example, when configured values for a plurality of parameters are provided through an RRC message and some parameters to be applied to the UE are indicated through an MAC CE, DCI may be used to indicate (on/off indicator) whether to apply a change of the parameters indicated by the MAC CE, that is, whether to activate a corresponding configuration. In particular, when a polar coding-related configuration needs to be rapidly changed, a MAC CE or DCI may be used rather than an RRC message.

Hereinafter, various signaling procedures between a UE and a base station when the base station determines a polar coding configuration for the UE will be described.

Figure 7:
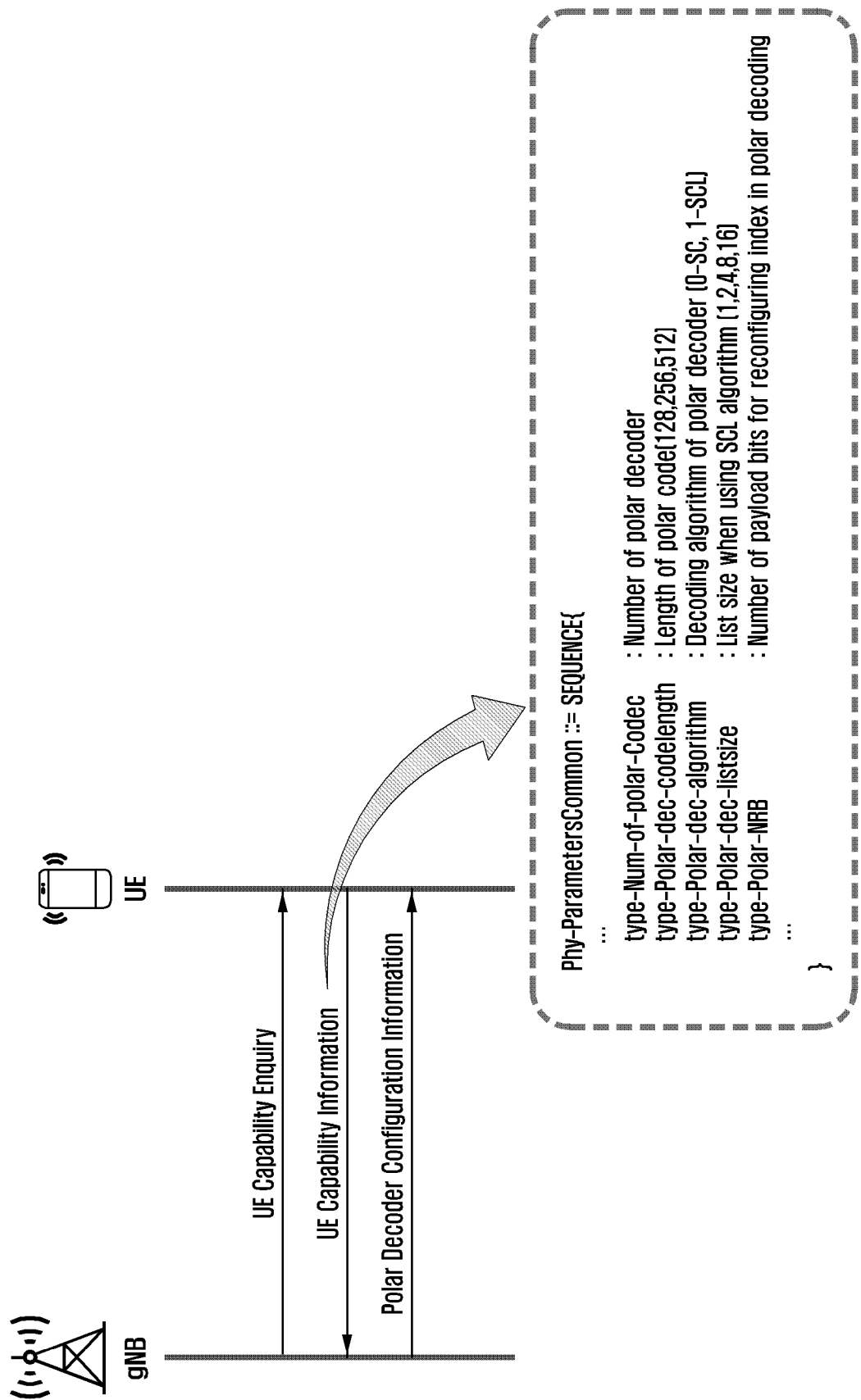
FIG. 7 illustrates an example of transmitting polar coding configuration information according to capability information of a user equipment (UE) according to an embodiment of the disclosure.
Figure 8:
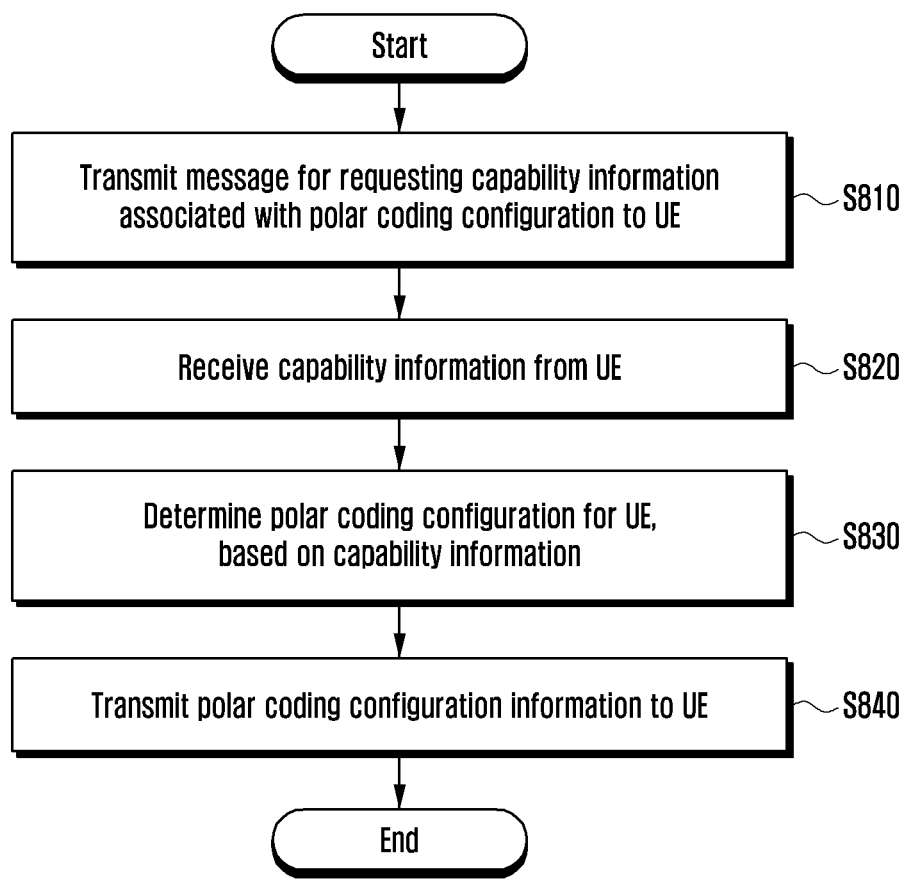
FIG. 8 is a flowchart illustrating an operation of a base station according to the example of FIG. 7 according to an embodiment of the disclosure.
Figure 9:
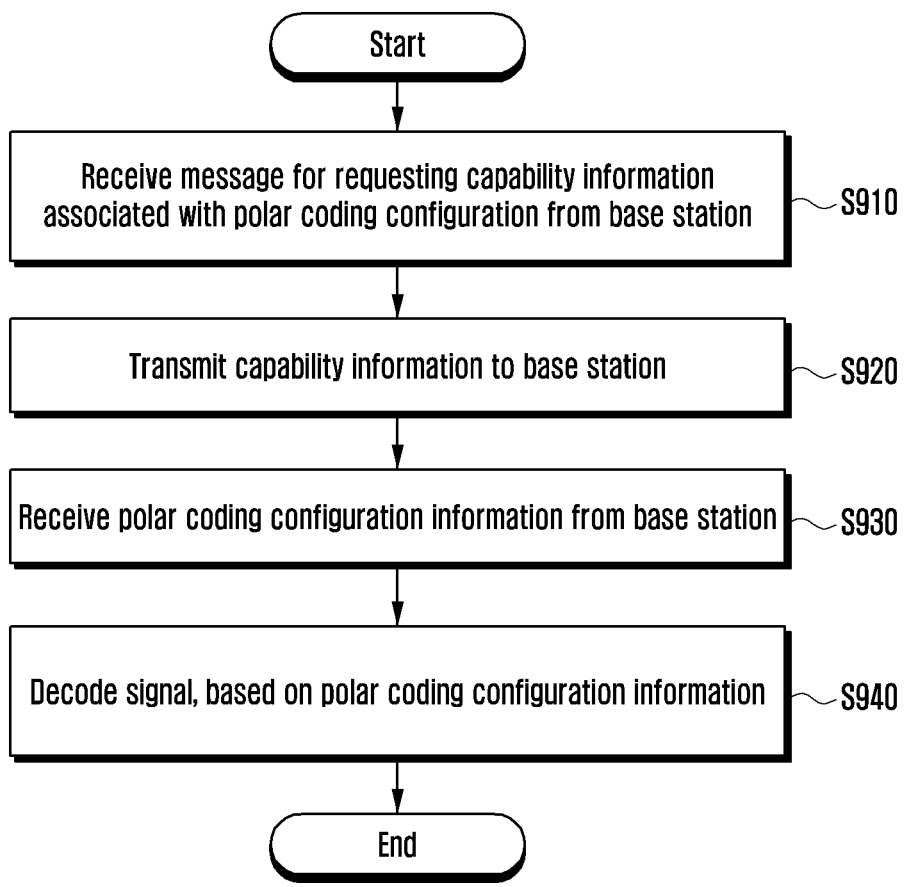
FIG. 9 is a flowchart illustrating an operation of a UE according to the example of FIG. 7 according to an embodiment of the disclosure.

FIG. 7 illustrates an example of transmitting polar coding configuration information according to capability information of a UE according to an embodiment of the disclosure, FIG. 8 is a flowchart illustrating an operation of a base station according to the example of FIG. 7 according to an embodiment of the disclosure, and FIG. 9 is a flowchart illustrating an operation of the UE according to the example of FIG. 7 according to an embodiment of the disclosure.

Referring to FIG. 7, the base station according to an embodiment of the disclosure may request transmission of capability information of the UE relating to a polar coding configuration from the UE by using a UE capability enquiry message, and may receive a message including the capability information relating to the polar coding configuration from the UE in response. Here, the capability information of the UE may be transmitted through a UE capability information message. The capability information of the UE is illustrated as being included in Phy-ParametersCommon in FIG. 7, but is not limited thereto. The capability information of the UE may include capability information of the UE for various parameters relating to the polar coding configuration described above. Upon receiving the capability information of the UE, the base station may determine a configuration relating to polar coding to be applied to the UE, based on the capability information, and may transmit determined configuration information to the UE.

A more specific operation of the base station for this example will be described with reference to FIG. 8.

Referring to FIG. 8, the base station may transmit a message for requesting transmission of capability information relating to a polar coding configuration to the UE in operation S810. The base station may request capability information of the UE for at least one parameter configuration relating to the polar coding configuration in order to variably apply the polar coding configuration to the UE.

When the capability information of the UE relating the polar coding configuration is received from the UE in operation S820, the base station may determine a polar coding configuration for the UE, based on the capability information in operation S830. For example, when the number of polar decoders to be used for communication is configured to be changed, the base station may configure the number of polar decoders not to exceed the maximum number of polar decoders used in the UE, based on the capability information of the UE. In addition, for example, the base station may identify that an SCL algorithm is available in a polar decoder of the UE through the capability information, may apply use of the SCL algorithm, and may change and configure a list size to be applied to decoding within the maximum list size range of the SCL algorithm used in the UE.

Although the polar coding configuration is illustrated as being determined based on the capability information of the UE, the base station may determine the polar coding configuration by additionally considering a channel state, a power state of the UE, or a characteristic (reliability) of a service provided to the UE.

When the polar coding configuration is determined, the base station according to an embodiment of the disclosure may transmit the determined polar coding configuration information to the UE in operation S840. As described above with reference to FIGS. 4 to 6, the configuration information may be transmitted to the UE through various types of signaling (RRC, MAC CE, or DCI).

Referring to FIG. 9, when receiving a message for requesting transmission of capability information from the base station in operation S910, the UE according to an embodiment of the disclosure may determine capability information of the UE relating to a polar coding configuration. For example, the UE may identify information on the maximum number of polar decodings supportable by the UE as the capability information. The UE may identify information on a code length supportable by a polar decoder of the UE as the capability information. The UE may identify information on a decoding algorithm supportable by the polar decoder of the UE as the capability information. When the SCL algorithm is supported in the UE, the UE may identify information on a maximum list size based on the algorithm as the capability information. The UE may identify information on a maximum NRB supportable by the UE or information on a reliability sequence as the capability information.

The UE may transmit a message including the determined capability information to the base station in operation S920, and may receive polar coding configuration information from the base station in operation S930. The UE may decode a signal, based on the polar coding configuration information in operation S940.

Figure 10:
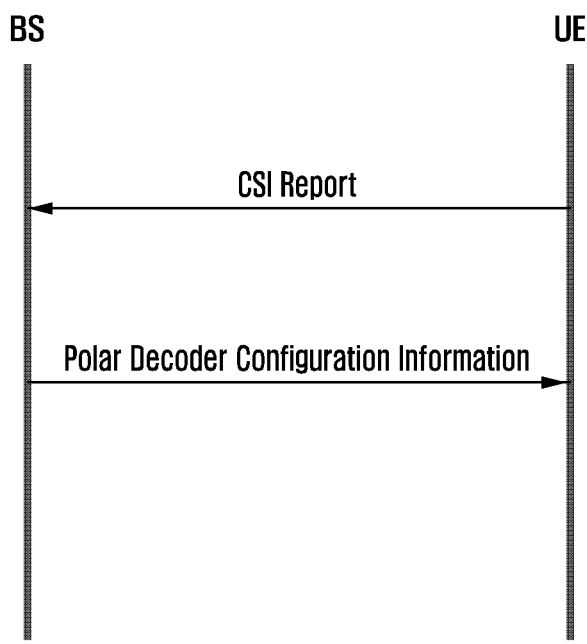
FIG. 10 illustrates an example of transmitting polar coding configuration information according to the state of a channel between a UE and a base station according to an embodiment of the disclosure.
Figure 11:
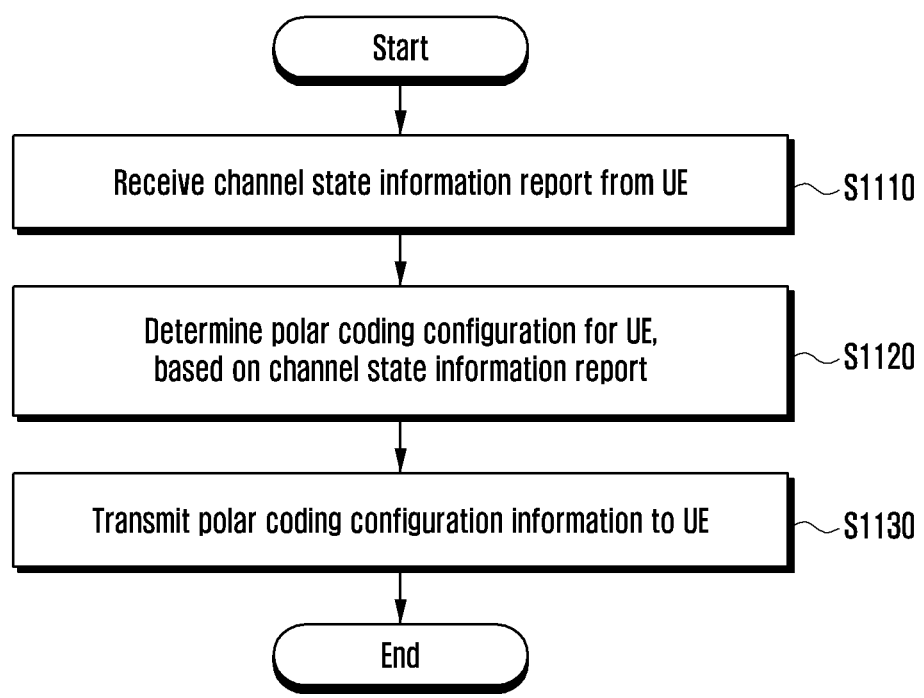
FIG. 11 is a flowchart illustrating an operation of a base station according to the example of FIG. 10 according to an embodiment of the disclosure.
Figure 12:
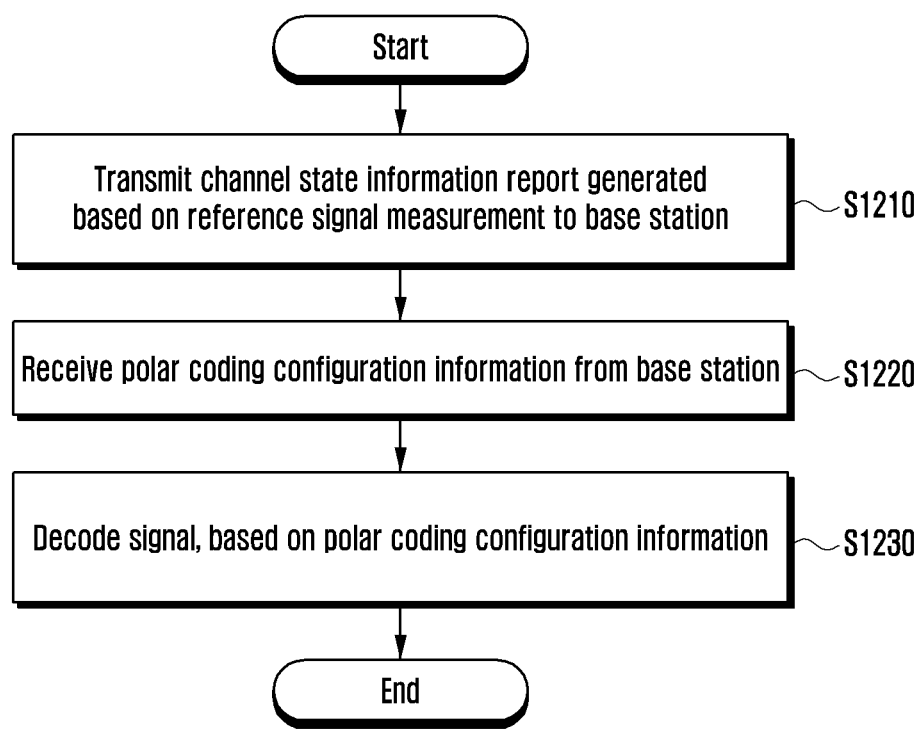
FIG. 12 is a flowchart illustrating an operation of a UE according to the example of FIG. 10 according to an embodiment of the disclosure.

FIG. 10 illustrates an example of transmitting polar coding configuration information according to the state of a channel between a UE and a base station according to an embodiment of the disclosure, FIG. 11 is a flowchart illustrating an operation of the base station according to the example of FIG. 10 according to an embodiment of the disclosure, and FIG. 12 is a flowchart illustrating an operation of the UE according to the example of FIG. 10 according to an embodiment of the disclosure.

Referring to FIG. 10, the UE may periodically/aperiodically transmit a channel state information (CSI) report to the base station according to a configuration, and the base station may receive the CSI report of the UE, and may determine a polar coding configuration for the UE, based on the CSI report.

Referring to FIG. 11, the base station according to an embodiment may receive a CSI report from the UE in operation S1110, and may determine a polar coding configuration for the UE, based on the CSI report in operation S1120. For example, when determining that a channel state, for example, an RSRP or SNR value, is a specific threshold value or greater, based on the CSI report of the UE, the base station according to the disclosure may determine a polar coding configuration for reducing a processing time for the UE. In this case, for example, the base station may configure an NRB to a maximum value, or may determine a polar coding configuration so that a short-length polar code is used.

Further, the base station may variably determine a polar coding configuration, based on a periodically transmitted CSI report. For example, when the base station provides configuration information for maximizing the number of polar decoders, based on a CSI report previously transmitted by the UE, but identifies a deterioration in the channel state according to a CSI report subsequently transmitted from the UE, the base station may determine configuration for reducing the number of polar decoders.

The base station may determine configuration information for the UE considering other factors in addition to the channel state. For example, as described above, when reliability needs to be guaranteed even in a relatively good channel state, a polar coding configuration for the UE may be determined to be different from that when only the channel state is considered.

The determined polar coding configuration information may be transmitted to the UE in operation S1130 Similarly, the configuration information may be transmitted according to the signaling methods of FIGS. 4 to 6.

Referring to FIG. 12, the UE according to an embodiment of the disclosure may measure a reference signal transmitted from the base station, and may transmit a measurement result to the base station via a CSI report in operation S1210. When configuration information on a polar coding configuration is received from the base station in operation S1220, the UE may decode a signal by using a polar coding configuration determined based on the configuration information in operation S1230.

Figure 13:
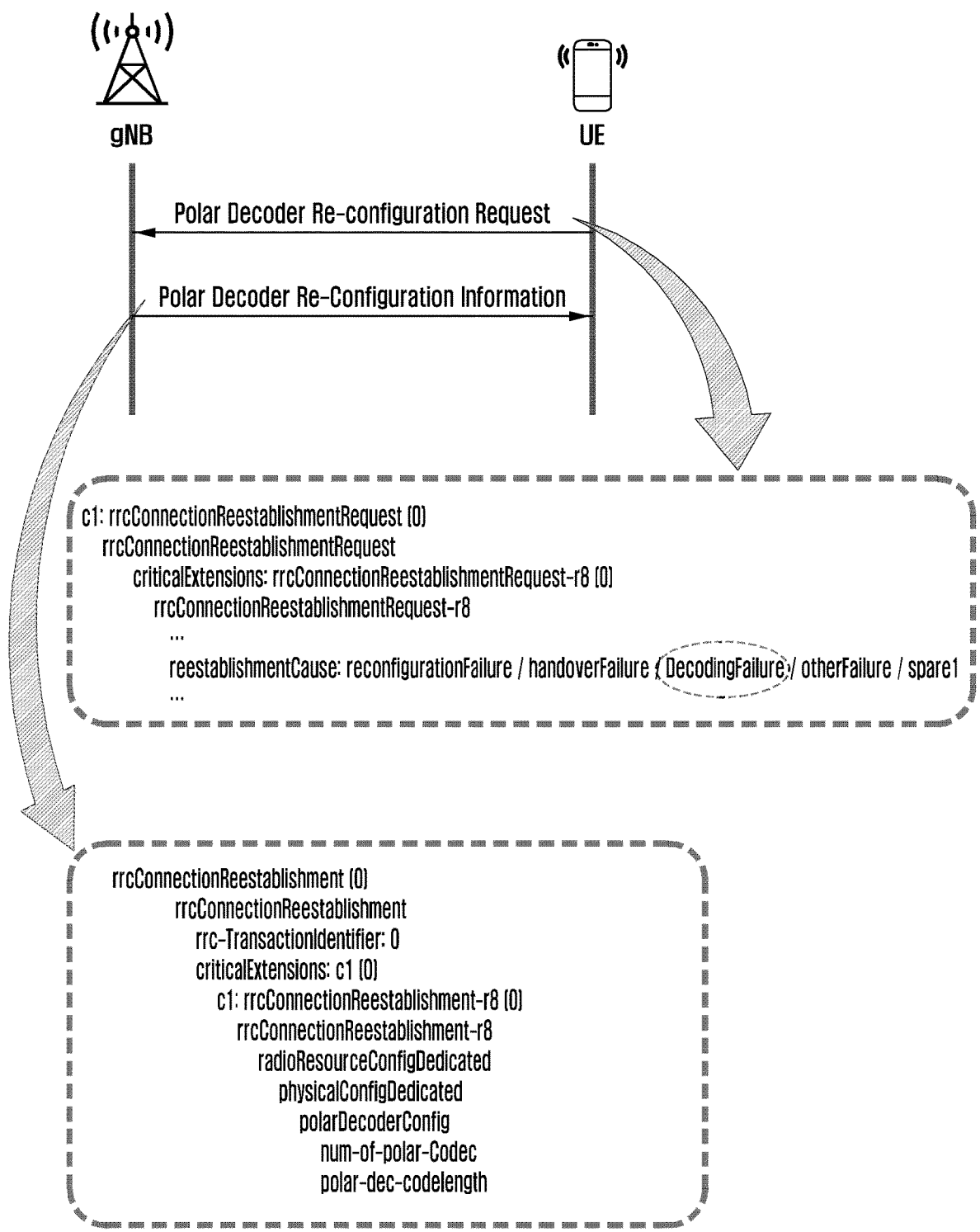
FIG. 13 illustrates an example of transmitting polar coding configuration information according to a request of a UE according to an embodiment of the disclosure.
Figure 14:
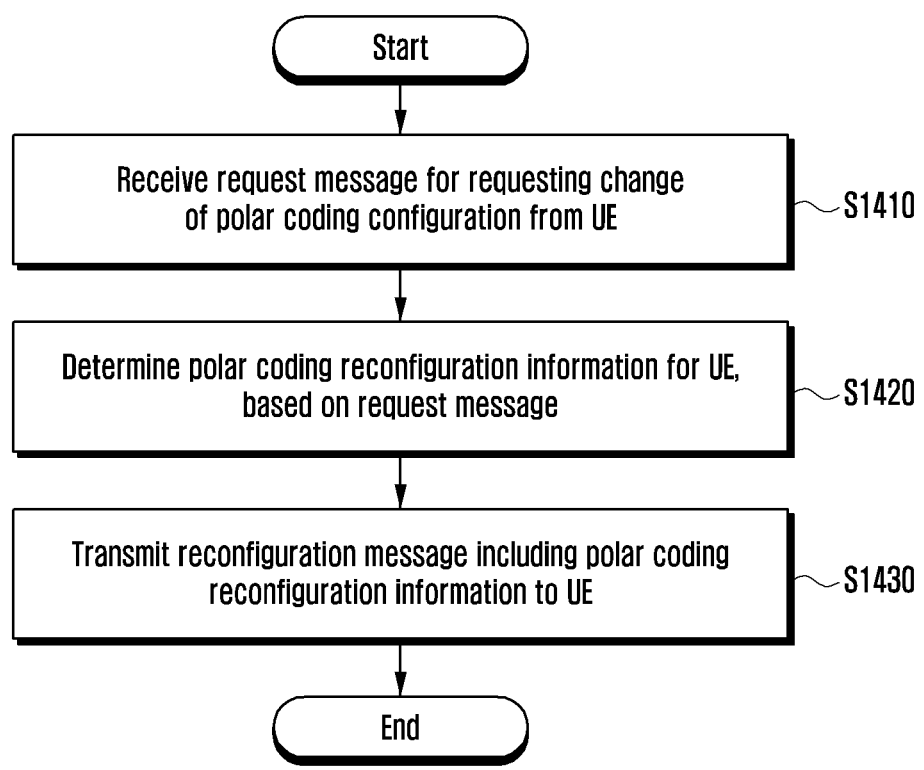
FIG. 14 is a flowchart illustrating an operation of a base station according to the example of FIG. 13 according to an embodiment of the disclosure.
Figure 15:
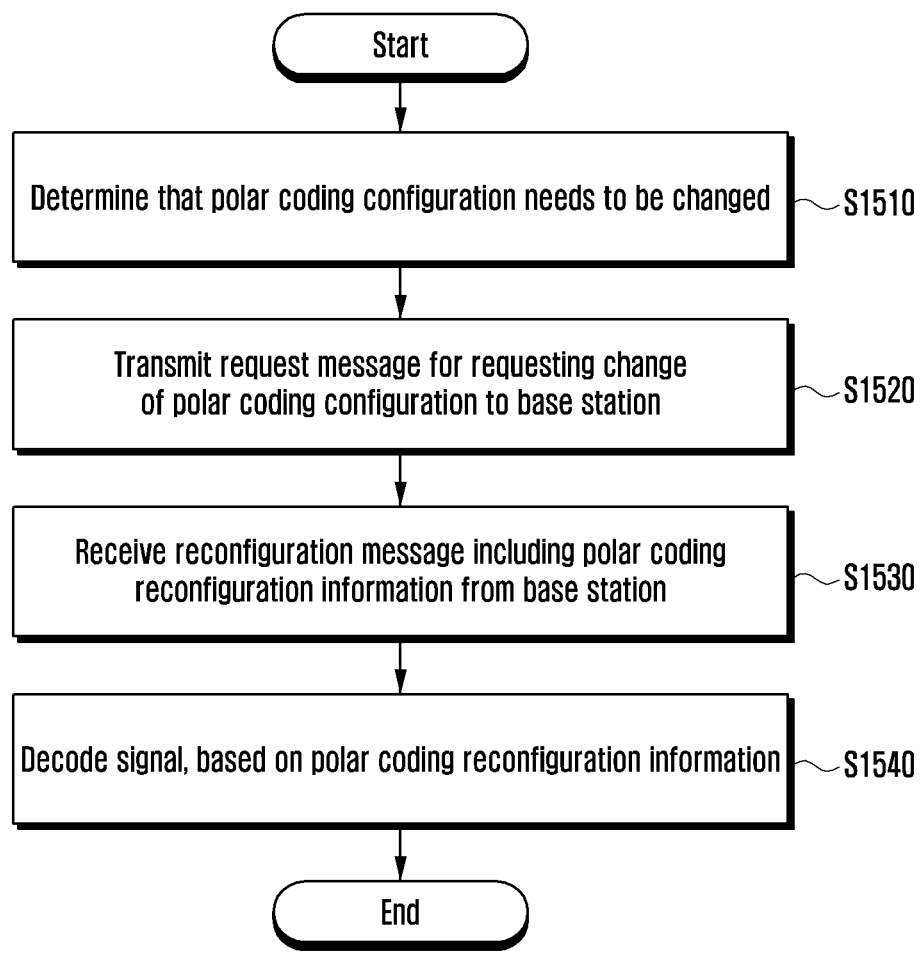
FIG. 15 is a flowchart illustrating an operation of a UE according to the example of FIG. 13 according to an embodiment of the disclosure.

FIG. 13 illustrates an example of transmitting polar coding configuration information according to a request of a UE according to an embodiment of the disclosure, FIG. 14 is a flowchart illustrating an operation of a base station according to the example of FIG. 13 according to an embodiment of the disclosure, and FIG. 15 is a flowchart illustrating an operation of the UE according to the example of FIG. 13 according to an embodiment of the disclosure.

Referring to FIG. 13, the UE according to an embodiment of the disclosure may transmit a message for requesting reconfiguration of polar coding configuration information to the base station. As illustrated in FIG. 13, the reconfiguration request message of the UE may be, for example, an RRCconnectionReetablishmentRequest message, but is not limited thereto. When requesting reconfiguration of the polar coding configuration information, the UE may indicate failure of decoding to the base station, as illustrated in FIG. 13. To this end, a decodingfailure field may be added to a reestablishmentcause value.

The base station may change a polar coding configuration for the UE, based on the information included in the message received from the UE, and may transmit the reconfigured polar coding configuration information to the UE. Here, the reconfigured polar coding configuration information may be included and transmitted in an RRCconnectionReestablishment message as illustrated in FIG. 13. The reconfigured polar coding configuration information is illustrated as being included in physicalConfigDedicated in the drawing, but is not limited thereto. The reconfigured polar coding configuration information may include information for changing at least some parameters of the polar coding configuration previously configured for the UE.

Although FIG. 13 shows a reconfiguration example of changing the previously configured configuration information upon request from the UE after the polar coding configuration information for the UE is transmitted to the UE, a procedure is not limited thereto. For example, the UE may request configuration information for variably applying a polar coding configuration from the base station while operating in a default configuration (e.g., a base polar decoding configuration in NR), and the base station may determine a variable polar coding configuration for the UE according to a channel state or the like in response to the request from the UE.

Referring to FIG. 14, the base station may receive a request message for requesting a change of a polar coding configuration from the UE in operation S1410, and may determine polar coding reconfiguration information for the UE, based on the request message in operation S1420. For example, the base station according to an embodiment of the disclosure may transmit first polar coding configuration information for the UE to reduce a processing time, and may then receive a request message including information indicating failure of decoding from the UE. In this case, the base station may determine to reconfigure second polar coding configuration information having a higher decoding capability than the first polar coding configuration information for the UE due to a channel state or the like. Further, for example, the base station may determine polar coding reconfiguration information for inactivating a variable function for a specific parameter activated to reduce the processing time in the polar coding configuration.

When the reconfiguration information is determined, the base station may transmit a reconfiguration message including the reconfiguration information to the UE in operation S1430.

Referring to FIG. 15, the UE may determine that a polar coding configuration needs to be changed in operation S1510. For example, when decoding is performed based on polar coding configuration information previously configured by the base station but the decoding fails, the UE may determine that the polar coding configuration needs to be changed. Further, for example, when decoding is performed using configuration information configured according to a criterion of a high SNR but a processing time increases and power consumption increases, the UE may determine to request a change of polar coding configuration.

When determining that the polar coding configuration needs to be changed, the UE may transmit a request message for requesting a change of polar coding configuration information to the base station in operation S1520, and may receive a reconfiguration message including polar coding reconfiguration information from the base station in response in operation S1530. As illustrated in FIG. 13, the UE may indicate failure of the decoding in the message for requesting reconfiguration.

The UE may perform a signal decoding operation by using the polar coding reconfiguration information received from the base station in operation S1540.

In the foregoing examples of FIGS. 7 to 15, each procedure for providing polar coding configuration information is separately illustrated, but at least two procedures may operate in combination. For example, the UE may transmit capability information and may report channel state information, and the base station may consider the capability information of the UE when determining polar coding configuration information for the UE, based on the reported channel state information. In addition, the UE may request a polar coding configuration from the base station, and thus the base station may request and obtain capability information from the UE, may determine a polar coding configuration, based on the capability information of the UE, and may transmit the polar coding configuration to the UE.

Figure 16:
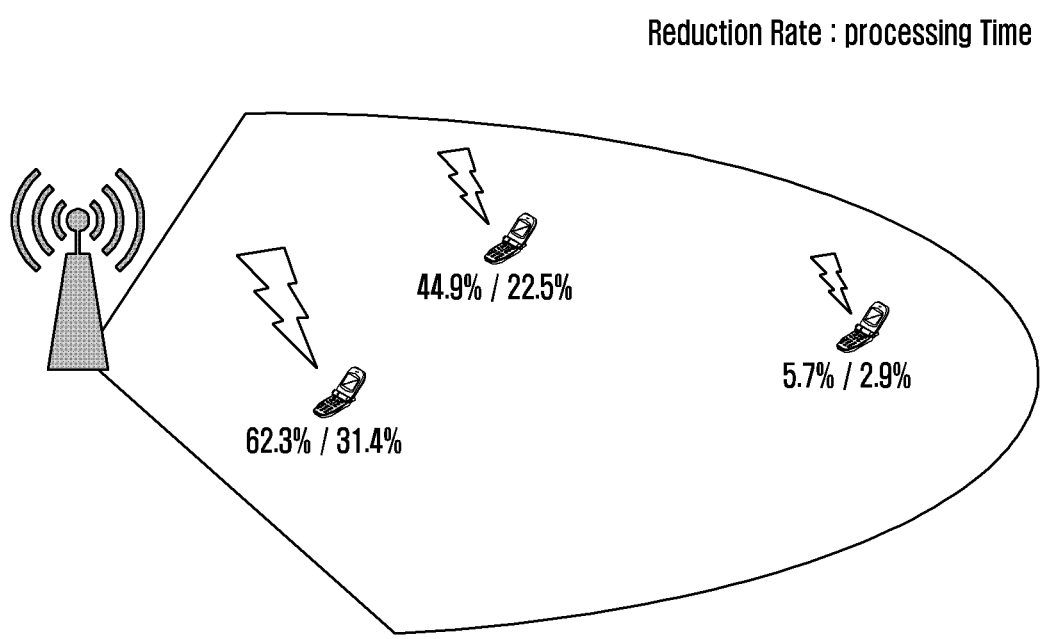
FIG. 16 illustrates an effect of a polar coding configuration according to an embodiment of the disclosure.

FIG. 16 illustrates an effect of a polar coding configuration according to an embodiment of the disclosure.

Referring to FIG. 16, a UE located relatively close to a base station is illustrated as a UE having a good channel state, and a UE located far from the base station is illustrated as a UE having a poor channel state. Hereinafter, although FIG. 16 is described assuming that the UE located relatively close to the base station has a good channel state, but a channel state may be good even though the physical distance between the base station and a UE is long, and the channel state may not be good even though the physical distance between the base station and the UE is short.

Referring to FIG. 16, the processing time or power consumption of the UE having the good channel state may be identified to be significantly reduced when a polar coding configuration is variably applied. The processing time or power consumption of even the UE having the poor channel state may be identified to be more reduced when a configuration is variably applied than when a configuration defined based on high error correction performance in NR is fixedly applied. That is, according to FIG. 16, it may be identified that efficient communication is possible by adaptively adjusting a polar coding configuration for each channel state, based on a processing time reduction being different according to the channel state.

As described above, the disclosure may support a method and an apparatus for an adaptive channel coding configuration between a base station and a UE in a wireless communication system, thereby adaptively changing a channel coding configuration optimized for a purpose, such as a processing time, power consumption, or an error correction capability, according to the situation of the UE or the base station or a channel environment between the UE and the base station.

Figure 17:
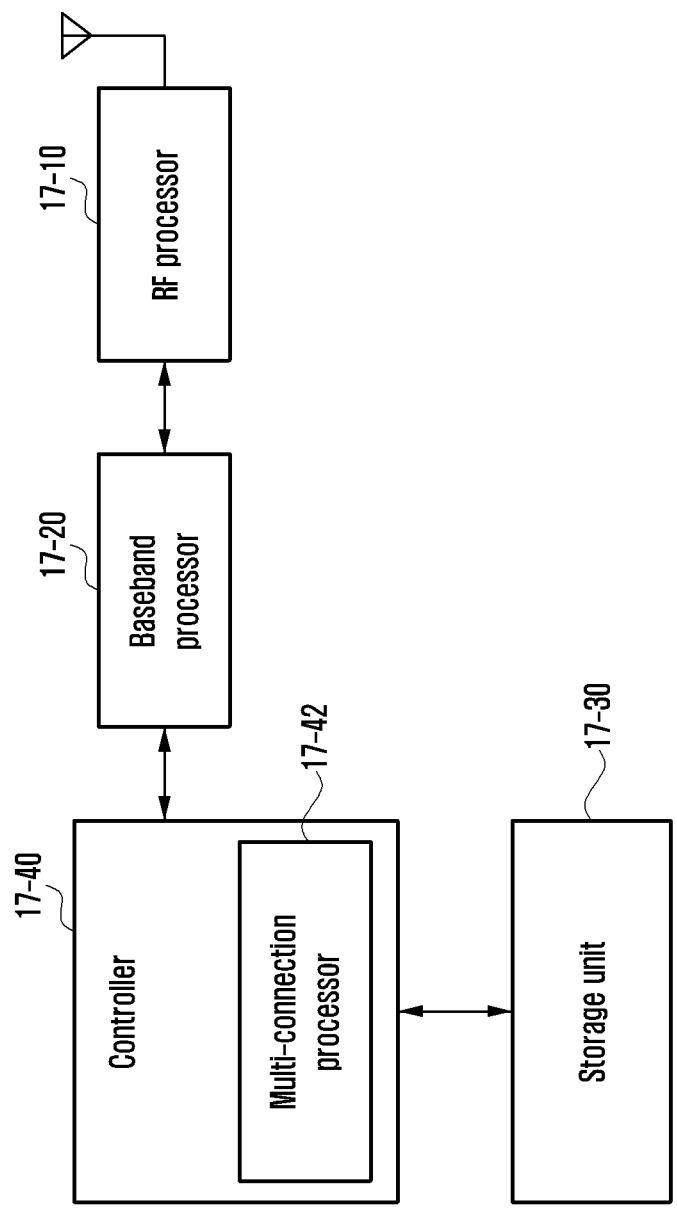
FIG. 17 is a block diagram illustrating the internal structure of a UE according to an embodiment of the disclosure.

FIG. 17 is a block diagram illustrating the internal structure of a UE according to an embodiment of the disclosure.

Referring to FIG. 17, the UE may include a radio frequency (RF) processor 17-10, a baseband processor 17-20, a storage unit 17-30, and a controller 17-40.

The RF processor 17-10 performs a function for transmitting or receiving a signal through a wireless channel, such as band conversion and amplification of a signal. That is, the RF processor 17-10 upconverts a baseband signal, provided from the baseband processor 17-20, into an RF band signal to transmit the RF band signal through an antenna, and downconverts an RF band signal, received through the antenna, into a baseband signal. For example, the RF processor 17-10 may include a transmission filter, a reception filter, an amplifier, a mixer, an oscillator, a digital-to-analog converter (DAC), and an analog-to-digital converter (ADC). Although FIG. 17 shows only one antenna, the UE may include a plurality of antennas. In addition, the RF processor 17-10 may include a plurality of RF chains. Further, the RF processor 17-10 may perform beamforming. For beamforming, the RF processor 17-10 may adjust the phase and strength of each of signals transmitted and received through a plurality of antennas or antenna elements. The RF processor 17-10 may perform MIMO, and may receive a plurality of layers when performing MIMO.

The baseband processor 17-20 performs a function of converting a baseband signal and a bit stream according to the physical-layer specification of a system. For example, in data transmission, the baseband processor 17-20 encodes and modulates a transmission bit stream, thereby generating complex symbols. In data reception, the baseband processor 17-20 demodulates and decodes a baseband signal, provided from the RF processor 17-10, thereby reconstructing a reception bit stream. For example, according to OFDM, in data transmission, the baseband processor 17-20 generates complex symbols by encoding and modulating a transmission bit stream, maps the complex symbols to subcarriers, and constructs OFDM symbols through an inverse fast Fourier transform (IFFT) and cyclic prefix (CP) insertion. In data reception, the baseband processor 17-20 divides a baseband signal, provided from the RF processor 17-10, into OFDM symbols, reconstructs signals mapped to subcarriers through a fast Fourier transform (FFT), and reconstructs a reception bit stream through demodulation and decoding.

As described above, the baseband processor 17-20 and the RF processor 17-10 transmit and receive signals. Accordingly, the baseband processor 17-20 and the RF processor 17-10 may be referred to as a transmitter, a receiver, a transceiver, or a communication unit. At least one of the baseband processor 17-20 and the RF processor 17-10 may include a plurality of communication modules to support a plurality of different radio access technologies. Further, at least one of the baseband processor 17-20 and the RF processor 17-10 may include different communication modules for processing signals in different frequency bands. For example, the different radio access technologies may include a wireless local area network (LAN) (e.g., IEEE 802.11), a cellular network (e.g., LTE), and the like. In addition, the different frequency bands may include a super high frequency (SHF) band (e.g., 2 NRHz) and a millimeter wave band (e.g., 60 GHz).

The storage unit 17-30 stores data, such as a default program, an application, and configuration information for operating the UE. In particular, the storage unit 17-30 may store information about a second access node performing wireless communication using a second radio access technology. The storage unit 17-30 provides stored data upon request from the controller 17-40.

The controller 17-40 controls overall operations of the UE. For example, the controller 17-40 transmits and receives signals through the baseband processor 17-20 and the RF processor 17-10. Further, the controller 17-40 records and reads data in the storage unit 17-30. To this end, the controller 17-40 may include at least one processor. For example, the controller 17-40 may include a communication processor (CP) (e.g., a multi-connection processor 17-42) to perform control for communication and an application processor (AP) to control an upper layer, such as an application.

Figure 18:
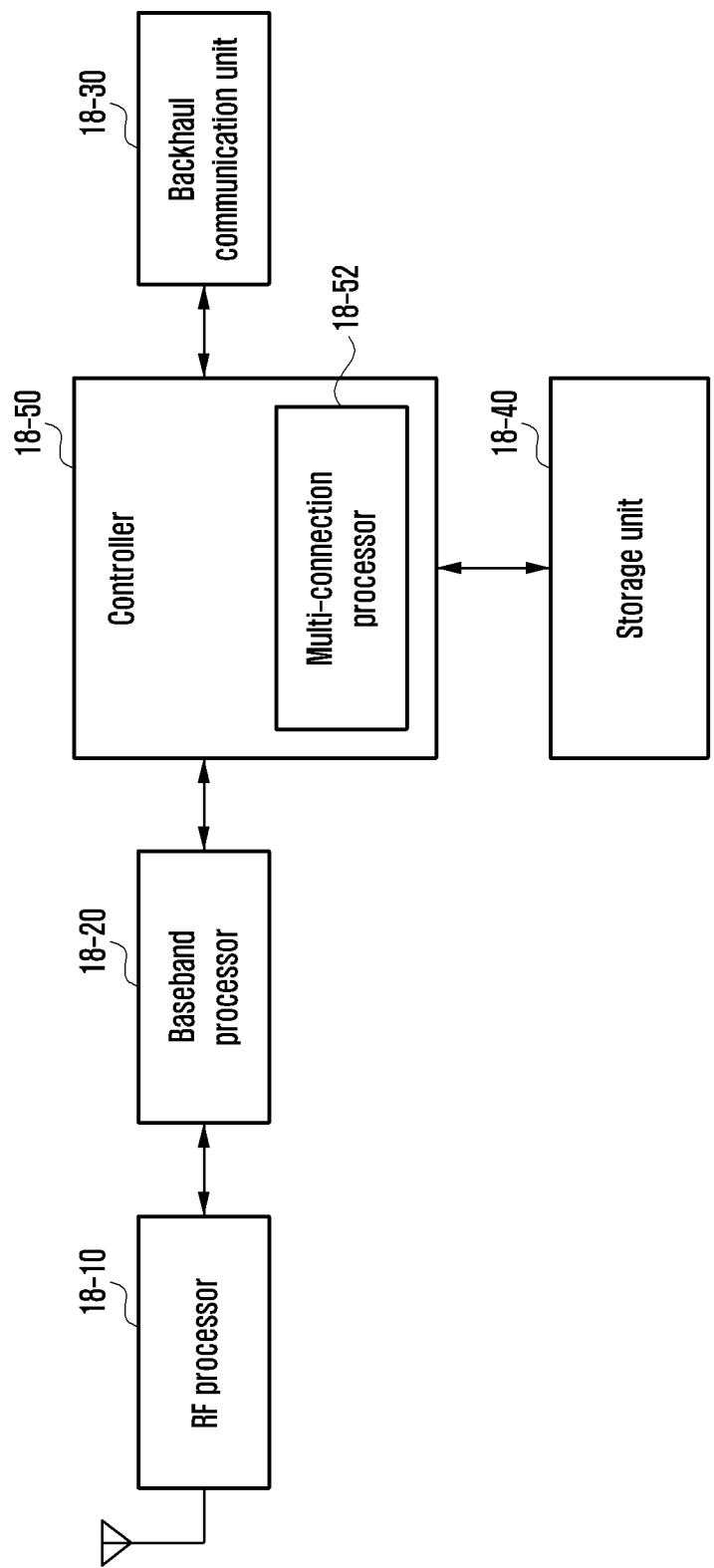
FIG. 18 is a block diagram illustrating the configuration of a base station according to an embodiment of the disclosure.

FIG. 18 is a block diagram illustrating the configuration of a base station according to an embodiment of the disclosure.

Referring to FIG. 18, the base station includes an RF processor 18-10, a baseband processor 18-20, a backhaul communication unit 18-30, a storage unit 18-40, and a controller 18-50.

The RF processor 18-10 performs a function for transmitting or receiving a signal through a wireless channel, such as band conversion and amplification of a signal. That is, the RF processor 18-10 upconverts a baseband signal, provided from the baseband processor 18-20, into an RF band signal to transmit the RF band signal through an antenna, and downconverts an RF band signal, received through the antenna, into a baseband signal. For example, the RF processor 18-10 may include a transmission filter, a reception filter, an amplifier, a mixer, an oscillator, a DAC, and an ADC. Although FIG. 18 shows only one antenna, a first access node may include a plurality of antennas. In addition, the RF processor 18-10 may include a plurality of RF chains. Further, the RF processor 18-10 may perform beamforming. For beamforming, the RF processor 18-10 may adjust the phase and strength of each of signals transmitted and received through a plurality of antennas or antenna elements. The RF processor 18-10 may transmit one or more layers, thereby performing downlink MIMO.

The baseband processor 18-20 performs a function of converting a baseband signal and a bit stream according to the physical-layer specification of a first radio access technology. For example, in data transmission, the baseband processor 18-20 encodes and modulates a transmission bit stream, thereby generating complex symbols. In data reception, the baseband processor 18-20 demodulates and decodes a baseband signal, provided from the RF processor 18-10, thereby reconstructing a reception bit stream. For example, according to OFDM, in data transmission, the baseband processor 18-20 generates complex symbols by encoding and modulating a transmission bit stream, maps the complex symbols to subcarriers, and constructs OFDM symbols through an IFFT and CP insertion. In data reception, the baseband processor 18-20 divides a baseband signal, provided from the RF processor 18-10, into OFDM symbols, reconstructs signals mapped to subcarriers through an FFT, and reconstructs a reception bit stream through demodulation and decoding. As described above, the baseband processor 18-20 and the RF processor 18-10 transmit and receive signals. Accordingly, the baseband processor 18-20 and the RF processor 18-10 may be referred to as a transmitter, a receiver, a transceiver, a communication unit, or a wireless communication unit.

The backhaul communication unit 18-30 provides an interface for performing communication with other nodes in a network. That is, the backhaul communication unit 18-30 converts a bit stream, transmitted from a main base station to another node, for example, a secondary base station or a core network, into a physical signal and may convert a physical signal, received from the other node, into a bit stream.

The storage unit 18-40 stores data, such as a default program, an application, and configuration information for operating the main base station. In particular, the storage unit 18-40 may store information on a bearer allocated to a connected UE, a measurement result reported from a connected UE, and the like. In addition, the storage unit 18-40 may store information as a criterion for determining whether to provide or stop a multi-connection to a UE. The storage unit 18-40 provides stored data upon request from the controller 18-50.

The controller 18-50 controls overall operations of the main base station. For example, the controller 18-50 transmits and receives signals through the baseband processor 18-20 and the RF processor 18-10 or through the backhaul communication unit 18-30. Further, the controller 18-50 records and reads data in the storage unit 18-40. To this end, the controller 18-50 may include at least one processor (e.g., multi-connection processor 18-52). Although not shown in the drawing, the controller 18-50 may include a selection module for determining a plurality of polar coding configurations by combining a plurality of configuration elements included in a polar decoder according to an embodiment of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   identifying a polar coding configuration parameter, the polar coding configuration parameter including at least one of a number of a polar decoder, a length of a polar code, a polar decoding algorithm, a list size of the polar decoding algorithm, a number of a reconfiguration bit to reconfigure an index for a polar decoding, or a polar sequence;
   transmitting, to a terminal, polar coding configuration information for the terminal including first information on the number of the polar decoder indicating a first value;
   receiving, from the terminal, a channel state information (CSI) report;
   identifying whether a reference signal received power (RSRP) value is greater than a threshold based on the CSI report; and
   in case that the RSRP value is greater the threshold, transmitting, to the terminal, a reconfiguration message including second information on the number of the polar decoder indicating a second value greater than the first value,
   wherein the second value is smaller than or equal to a maximum number of the polar decoder supported by the terminal.

2. The method of claim 1, further comprising:
   receiving, from the terminal, capability information associated with polar coding,
   wherein the polar coding configuration information for the terminal, is determined based on the capability information, and
   wherein the capability information includes at least one of the information on the maximum number of the polar decoder supported by the terminal, information on a decoding algorithm supported by the terminal, information on a maximum list size corresponding to the decoding algorithm, information on a maximum number of the reconfiguration bit, or information on a polar sequence supported by the terminal.

3. The method of claim 1,
   wherein the polar coding configuration information for the terminal further includes information on the number of the reconfiguration bit, and
   wherein the reconfiguration message further includes information for configuring the number of the reconfiguration bit to a maximum value.

4. The method of claim 1, further comprising:
   receiving, from the terminal, a request message for requesting a change of the polar coding configuration information for the terminal,
   wherein the reconfiguration message is transmitted based on the request message.

5. A method of performed by a terminal in a wireless communication system, the method comprising:
   receiving, from a base station, polar coding configuration information for the terminal including first information on a number of a polar decoder among a polar coding configuration parameter,
   wherein the polar coding configuration parameter further includes information on at least one of a length of a polar code, a polar decoding algorithm, a list size of the polar decoding algorithm, a number of a reconfiguration bit to reconfigure an index for a polar decoding, or a polar sequence, and the first information indicating a first value;
   transmitting, to the base station, a channel state information (CSI) report; and
   in case that a reference signal received power (RSRP) value associated with the CSI report is greater a threshold, receiving, from the base station, a reconfiguration message including second information on the number of the polar decoder indicating a second value greater than the first value,
   wherein the second value is smaller than or equal to a maximum number of the polar decoder supported by the terminal.

6. The method of claim 5, further comprising:
   transmitting, to the base station, capability information associated with polar coding,
   wherein the polar coding configuration information for the terminal is received based on the capability information, and
   wherein the capability information includes at least one of information on the maximum number of the polar decoder supported by the terminal, information on a decoding algorithm supported by the terminal, information on a maximum list size corresponding to the decoding algorithm, information on a maximum number of the reconfiguration bit, or information on a polar sequence supported by the terminal.

7. The method of claim 5,
   wherein the polar coding configuration information for the terminal further includes information on the number of the reconfiguration bit, and
   wherein the reconfiguration message further includes information for configuring the number of the reconfiguration bit to a maximum value.

8. The method of claim 5, further comprising:
transmitting, to the base station, a request message for requesting a change of the polar coding configuration information for the terminal,
wherein the reconfiguration message is received based on the request message, and
wherein a signal is decoded based on the reconfiguration message.

9. A base station in a wireless communication system, the base station comprising:
a transceiver; and
at least one processor configured to:
identify a polar coding configuration parameter, the polar coding configuration parameter including at least one of a number of a polar decoder, a length of a polar code, a polar decoding algorithm, a list size of the polar decoding algorithm, a number of a reconfiguration bit to reconfigure an index for a polar decoding, or a polar sequence,
control the transceiver to transmit, to a terminal, polar coding configuration information for the terminal including first information on the number of the polar decoder indicating a first value,
control the transceiver to receive, from the terminal, a channel state information (CSI) report,
identify whether a reference signal received power (RSRP) value is greater than a threshold based on the CSI report, and
in case that the RSRP value is greater the threshold, control the transceiver to transmit, to the terminal, a reconfiguration message including second information on the number of the polar decoder indicating a second value greater than the first value,
wherein the second value is smaller than or equal to a maximum number of the polar decoder supported by the terminal.

10. The base station of claim 9,
wherein the at least one processor is further configured to:
control the transceiver to receive, from the terminal, capability information associated with polar coding,
wherein the polar coding configuration information for the terminal is determined based on the capability information, and
wherein the capability information includes at least one of the information on the maximum number of the polar decoder supported by the terminal, information on a decoding algorithm supported by the terminal, information on a maximum list size corresponding to the decoding algorithm, information on a maximum number of the reconfiguration bit, or information on a polar sequence supported by the terminal.

11. The base station of claim 9,
wherein the polar coding configuration information for the terminal further includes information on the number of the reconfiguration bit, and
wherein the reconfiguration message further includes information for configuring the number of the reconfiguration bit to a maximum value.

12. The base station of claim 9,
wherein the at least one processor is further configured to:
control the transceiver to receive, from the terminal, a request message for requesting a change of the polar coding configuration, and wherein the reconfiguration message is transmitted based on the request message.

13. A terminal in a wireless communication system, the terminal comprising:
a transceiver; and
at least one processor configured to:
control the transceiver to receive, from a base station, polar coding configuration information for the terminal including first information on a number of a polar decoder among a polar coding configuration parameter,
wherein the polar coding configuration parameter further includes information on at least one of a length of a polar code, a polar decoding algorithm, a list size of the polar decoding algorithm, a number of a reconfiguration bit to reconfigure an index for a polar decoding, or a polar sequence, and the first information indicating a first value,
control the transceiver to transmit, to the base station, a channel state information (CSI) report, and
in case that a reference signal received power (RSRP) value associated with the CSI report is greater a threshold, control the transceiver to receive, from the base station, a reconfiguration message including second information on the number of the polar decoder indicating a second value greater than the first value,
wherein the second value is smaller than or equal to a maximum number of the polar decoder supported by the terminal.

14. The terminal of claim 13,
wherein the at least one processor is further configured to control the transceiver to transmit, to the base station, capability information associated with polar coding,
wherein the polar coding configuration information for the terminal is received based on the capability information, and
wherein the capability information includes at least one of information on the maximum number of the polar decoder supported by the terminal, information on a decoding algorithm supported by the terminal, information on a maximum list size corresponding to the decoding algorithm, information on a maximum number of the reconfiguration bit, or information on a polar sequence supported by the terminal.

15. The terminal of claim 13,
wherein the polar coding configuration information further includes information on the number of the reconfiguration bit, and
wherein the reconfiguration message further includes information for configuring the number of the reconfiguration bit to a maximum value.

16. The terminal of claim 13,
wherein the at least one processor is further configured to control the transceiver to transmit, to the base station, a request message for requesting a change of the polar coding configuration information for the terminal,
wherein the reconfiguration message is received based on the request message, and
wherein a signal is decoded based on the reconfiguration message.

* * * * *